(12) United States Patent
Horiuchi et al.

(10) Patent No.: US 10,539,900 B2
(45) Date of Patent: Jan. 21, 2020

(54) CONDUCTIVE MEMBER FOR ELECTROPHOTOGRAPHIC APPARATUS

(71) Applicant: Sumitomo Riko Company Limited, Komaki-shi, Aichi (JP)

(72) Inventors: Takeru Horiuchi, Komaki (JP); Manabu Sakuda, Komaki (JP); Yosuke Hayashi, Komaki (JP); Yuma Yoshida, Komaki (JP); Daisuke Inoue, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 175 days.

(21) Appl. No.: 15/671,293

(22) Filed: Aug. 8, 2017

(65) Prior Publication Data
US 2018/0011416 A1   Jan. 11, 2018

Related U.S. Application Data

(63) Continuation of application No. PCT/JP2016/059794, filed on Mar. 28, 2016.

(30) Foreign Application Priority Data

Mar. 30, 2015  (JP) ................................ 2015-068338
Jun. 29, 2015  (JP) ................................ 2015-129643
Dec. 24, 2015  (JP) ................................ 2015-250954

(51) Int. Cl.
*G03G 5/00* (2006.01)
*G03G 15/00* (2006.01)
*C08L 7/00* (2006.01)
*C08L 15/00* (2006.01)
*C08L 21/00* (2006.01)
*G03G 15/02* (2006.01)
*C08L 9/00* (2006.01)
*C08L 11/00* (2006.01)

(52) U.S. Cl.
CPC ............ *G03G 15/0233* (2013.01); *C08L 7/00* (2013.01); *C08L 9/00* (2013.01); *C08L 11/00* (2013.01); *C08L 21/00* (2013.01)

(58) Field of Classification Search
CPC .. C08L 21/02; C08L 15/00; C08L 7/00; C08L 9/04; G03G 15/00; G03G 15/2053; G03G 15/20; G03G 5/0553
See application file for complete search history.

(56) References Cited

U.S. PATENT DOCUMENTS

| 6,043,308 | A | * | 3/2000 | Tanahashi | ................... C08J 3/24 524/495 |
| 6,078,773 | A | | 6/2000 | Shimojo et al. | |
| 2002/0022142 | A1 | * | 2/2002 | Harada | ..................... C08K 3/04 428/493 |

FOREIGN PATENT DOCUMENTS

| JP | 10-288902 A | 10/1998 |
| JP | 2006-258932 A | 9/2006 |
| JP | 2008-250101 A | 10/2008 |
| JP | 2010-248480 A | 11/2010 |

OTHER PUBLICATIONS

International Search Report dated Apr. 19, 2016, issued in counterpart International Application No. PCT/JP2016/059794 (1 page).

* cited by examiner

*Primary Examiner* — Haidung D Nguyen
(74) *Attorney, Agent, or Firm* — Westerman, Hattori, Daniels & Adrian, LLP

(57) ABSTRACT

To provide a conductive roll for an electrophotographic apparatus that includes a conductive rubber elastic body layer having a lower hardness and lower settling properties than a conventional conductive rubber elastic body layer.
A conductive roll 10 for an electrophotographic apparatus includes a shaft body 12, and a conductive rubber elastic body layer 14 provided on the outer periphery of the shaft body 12, the conductive rubber elastic body layer 14 containing polar rubber, non-polar rubber, and a dispersing agent, wherein the polar rubber is at least one of nitrile rubber, hydrin rubber, and chloroprene rubber, wherein the non-polar rubber is at least one of isoprene rubber, hydrogenated isoprene rubber, and natural rubber, and wherein the dispersing agent is at least one of a polymer containing a block made of a nitrile rubber component and a block made of an isoprene rubber component, modified natural rubber, and modified isoprene rubber.

28 Claims, 10 Drawing Sheets

CONDUCTIVE MEMBER FOR ELECTROPHOTOGRAPHIC APPARATUS

TECHNICAL FIELD

The present invention relates to conductive members for an electrophotographic apparatus.

BACKGROUND ART

In electrophotographic apparatuses using a xerography method such as a copier, a printer, and a facsimile apparatus, conductive rolls such as a charging roll, a developing roll, a transfer roll, and a toner supply roll are provided around photosensitive drums. As the conductive rolls, there are known conductive rolls provided with conductive rubber elastic body layers on the outer peripheries of their shaft bodies.

CITATION LIST

Patent Literature

Patent Document 1: Patent JP2008-250101

SUMMARY OF INVENTION

Problems to be Solved by the Invention

In Patent Document 1, the conductive rubber elastic body layer has a structure in which a non-polar rubber material is dispersed as an island phase in a continuous phase made from a polar rubber material, so that the layer has a sufficiently reduced hardness while demonstrating excellent settling properties. However, for example, in a developing roll, a conductive rubber elastic body layer is required to have a lower hardness and lower settling properties than a conventional conductive rubber elastic body layer from the view point of reducing stress imposed on toner to make the toner less likely to be destroyed to increase the longevity of image quality, and the viewpoint of making the roll shape less likely to creep by compression of a contacting member to further increase the product lifetime.

An object of the present invention is to provide a conductive member for an electrophotographic apparatus that includes a conductive rubber elastic body layer having a lower hardness and lower settling properties than a conventional conductive rubber elastic body layer.

Means for Solving the Problem

In order to solve the problem described above, a conductive member for an electrophotographic apparatus according to an embodiment of the present invention includes a conductive rubber elastic body layer containing polar rubber, non-polar rubber, and a dispersing agent. The polar rubber defines at least one of nitrile rubber, hydrin rubber, and chloroprene rubber. The non-polar rubber defines at least one of isoprene rubber, hydrogenated isoprene rubber, and natural rubber. The dispersing agent defines at least one of a polymer containing a block made of a nitrile rubber component and a block made of an isoprene rubber component, modified natural rubber, and modified isoprene rubber.

It is preferable that the content of the dispersing agent should be within a range of 0.1 to 20 parts by mass relative to total 100 parts by mass of the polar rubber and the non-polar rubber. It is preferable that the dispersing agent should be at least one of epoxidized natural rubber and epoxidized isoprene rubber. It is preferable that the content ratio between the polar rubber and the non-polar rubber should be, in parts by mass, within a range of 20:80 to 90:10. It is preferable that the conductive rubber elastic body layer should include a first polymer phase containing the polar rubber and a second polymer phase containing the non-polar rubber, the second polymer phase being present separated from the first polymer phase. It is preferable that in the conductive rubber elastic body layer, the first polymer phase should be a continuous phase, and the second polymer phase should be one of a continuous phase and a dispersed phase. It is preferable that the first polymer phase should contain a larger amount of conductive agent than the second polymer phase.

It is preferable that either one of the first polymer phase and the second polymer phase should be a conductive phase, and the other should be a non-conductive phase. It is preferable that the conductive phase should have an area ratio within a range of 10 to 90% in an arbitrarily selected region of a five-μm square in the conductive rubber elastic body layer. It is preferable that the conductive member should have a resistance within a range of $1\times10^2$ to $1\times10^9 \Omega$ when a voltage of 10 V is applied. It is preferable that the conductive phase should contain an electroconductive agent, and the electroconductive agent should have a specific surface area within a range of 150 to 1500 $m^2/g$. It is preferable that the conductive phase should have an area ratio within a range of 20 to 80% in an arbitrarily selected region of a five-μm square in the conductive rubber elastic body layer.

It is preferable that the conductive rubber elastic body layer should further include an interface phase between the first polymer phase and the second polymer phase, the interface phase containing the dispersing agent. It is preferable that the interface phase should have a thickness within a range of 10 to 1000 nm.

Advantageous Effects of Invention

With the conductive member for an electrophotographic apparatus according to embodiments of the present invention, a low hardness and low settling properties can be demonstrated since the polar rubber and the non-polar rubber in the conductive rubber elastic body layer are blended together with the dispersing agent, which cannot be obtained only by just blending a polar rubber and a non-polar rubber.

When the content of the dispersing agent is within the specific range, the conductive rubber elastic body layer can have a lower hardness and lower settling properties. When the dispersing agent is epoxidized natural rubber, the conductive rubber elastic body layer can have a lower hardness and lower settling properties. When the content ratio between the polar rubber and the non-polar rubber is within the specific range, the conductive rubber elastic body layer can have a good balance among conductive properties, a low hardness, and low settling properties. When the first polymer phase containing the polar rubber is a continuous phase, and the second polymer phase containing the non-polar rubber and being present separated from the first polymer phase is a dispersed phase, the continuous phase that contains the polar rubber in the thickness direction of the conductive rubber elastic body layer is easy to stick to easily improve the conductive properties. When the first polymer phase containing the polar rubber contains a larger amount of conductive agent than the second polymer phase containing the non-polar rubber, the hardness is easily reduced while the conductive properties are secured.

Since the conductive rubber elastic body layer includes two phases of a conductive phase and a non-conductive phase, the conductive rubber elastic body layer demonstrates a low hardness and low settling properties because of the presence of the non-conductive phase, which cannot be obtained only by the presence of the conductive phase. When the conductive phase and the non-conductive phase are uniformly dispersed at a toner size level (finely dispersed) such that both of the conductive phase and the non-conductive phase are present at a predetermined ratio in an arbitrarily selected region of a five-μm square in the conductive rubber elastic body layer, the conductive rubber elastic body layer demonstrates a lower hardness and lower settling properties. In addition, charge control at a toner size level can be performed to suppress resistance irregularity, allowing excellent charging properties to be demonstrated. At this time, when the conductive member has a resistance within a range of $1 \times 10^2$ to $1 \times 10^9 \Omega$ when a voltage of 10 V is applied, a satisfying low hardness and satisfying low settling properties can be easily achieved while conductive properties required of a conductive member for an electrophotographic apparatus is secured. When the conductive phase contains an electroconductive agent having a specific surface area within a range of 150 to 1500 $m^2/g$, which is an electroconductive agent having a relatively large specific surface area, the electroconductive agent is more excellent in conductive performance, so that the amount of the electroconductive agent required in order to obtain desired conductive properties can be reduced, whereby a low hardness and low lower settling properties can be easily secured. When the conductive phase has an area ratio within a range of 20 to 80% in an arbitrarily selected region of a five-μm square in the conductive rubber elastic body layer, resistance irregularity can be further suppressed, allowing excellent charging properties to be demonstrated.

By further including an interface phase containing the dispersing agent between the first polymer phase and the second polymer phase, the dispersing agent that appears on the surface of the conductive rubber elastic body layer is reduced, which suppresses contamination caused by the dispersing agent. At this time, when the interface phase has a thickness within a range of 10 to 1000 nm, a low hardness and low settling properties that are achieved by including two phases of the first polymer phase and the second polymer phase can be easily demonstrated.

BRIEF DESCRIPTION OF DRAWINGS

FIG. 4A illustrates particles having the shape approximate to a spherical shape and a relatively small specific surface area while FIG. 4B illustrates particles having a large surface asperity, a non-spherical shape, and a relatively large specific surface area.

MODE FOR CARRYING OUT THE INVENTION

Figure 1A:
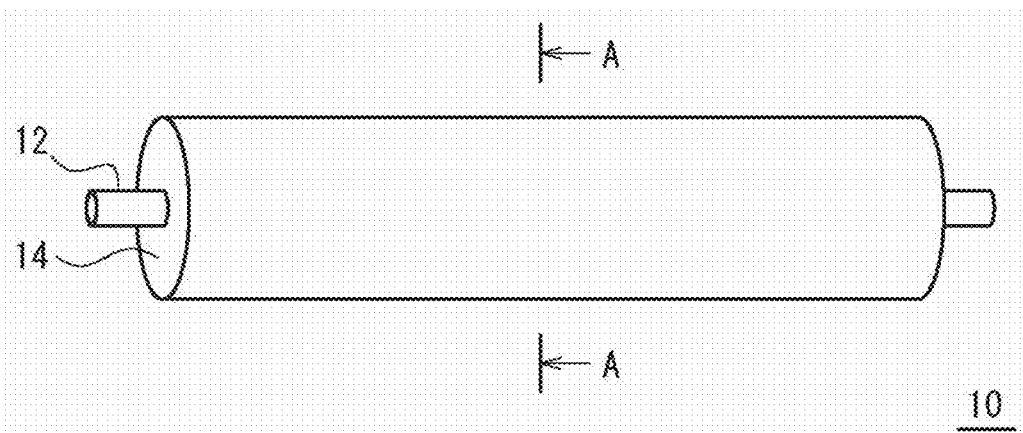
FIG. 1A is an external schematic diagram of a conductive roll for an electrophotographic apparatus according to one embodiment of the present invention.

Hereinafter, a description of embodiments of the present invention will be provided referring to the drawings.

The conductive member for an electrophotographic apparatus according to embodiments of the present invention (hereinafter, referred to sometimes as the present conductive member) includes a conductive rubber elastic body layer made of an elastic body having conductive properties. The present conductive member is suitably used for conductive rolls such as a charging roll, a developing roll, a transfer roll, and a toner supply roll, and endless belts (conductive belts) such as an intermediate transfer belt and a paper transfer and conveyance belt that are used in electrophotographic apparatuses using a xerography method such as a copier, a printer, and a facsimile apparatus.

Figure 1B:
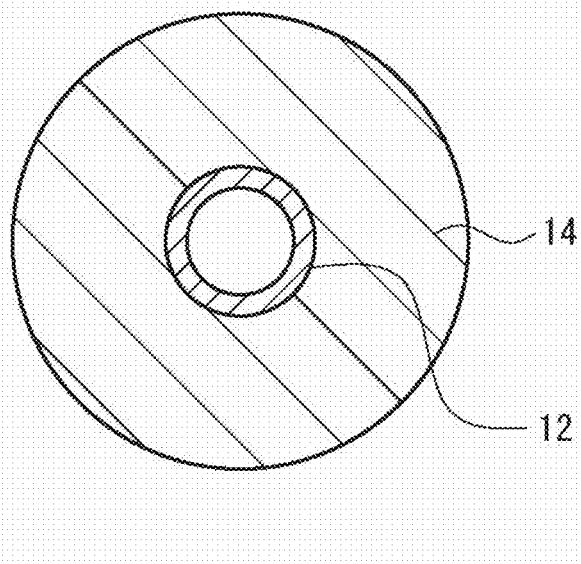
FIG. 1B is a cross-sectional view of the same taken along the line A-A of FIG. 1A.
Figure 2A:
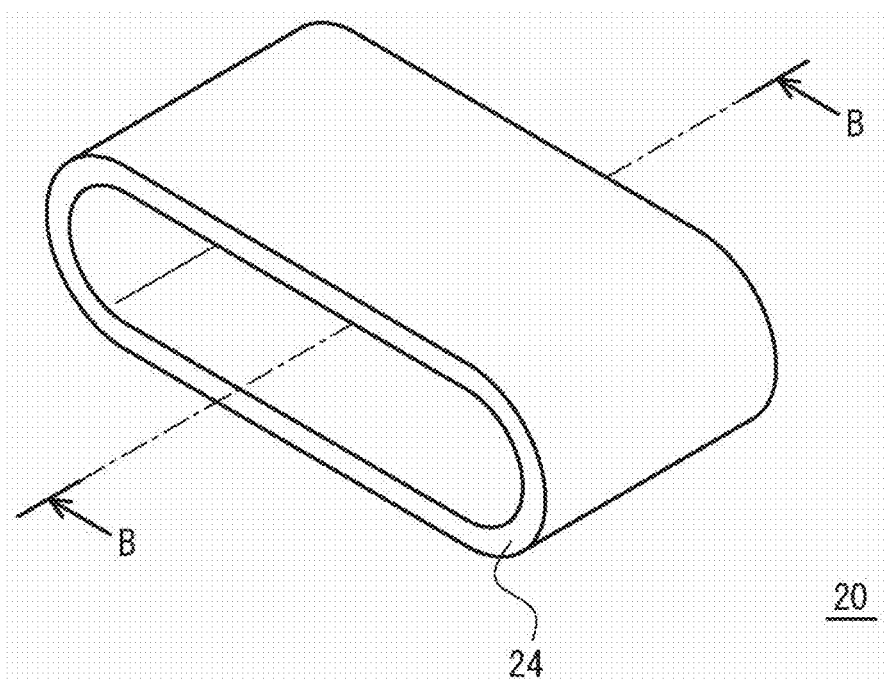
FIG. 2A is an external schematic diagram of a conductive belt (endless belt) for an electrophotographic apparatus according to one embodiment of the present invention.
Figure 2B:
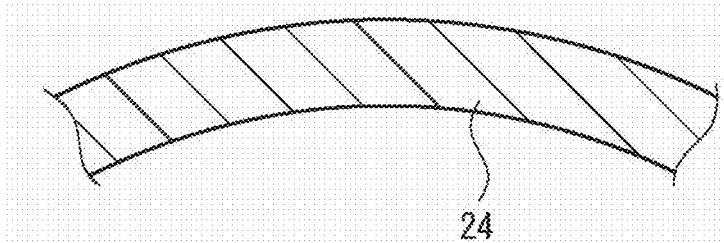
FIG. 2B is a cross-sectional view of the same along the line B-B of FIG. 2A.

FIG. 1A is an external schematic diagram of a conductive roll for an electrophotographic apparatus according to one embodiment of the present invention, and FIG. 1B is a cross-sectional view of the same taken along the line A-A of FIG. 1A. FIG. 2A is an external schematic diagram of a conductive belt (endless belt) for an electrophotographic apparatus according to one embodiment of the present invention, and FIG. 2B is a cross-sectional view of the same along the line B-B of FIG. 2A.

As illustrated in FIG. 1, a conductive roll for an electrophotographic apparatus (hereinafter, referred to sometimes simply as the conductive roll 10) according to one embodiment of the present invention includes a shaft body 12, and a conductive rubber elastic body layer 14 provided on the outer periphery of the shaft body 12. The conductive rubber elastic body layer 14 defines a base layer of the conductive roll 10. A resistance adjusting layer, a surface layer, or the like may be provided on the outer periphery of the conductive rubber elastic body layer 14 as necessary.

The shaft body 12 is not limited particularly only if having conductive properties. Specific examples of the shaft body 12 include core metals of a solid body or a hollow body that are made from metal such as iron, stainless steel, and aluminum. An adhesive agent, a primer, or the like maybe applied on the surface of the shaft body 12 as necessary. The adhesive agent, the primer, or the like may be made conductive as necessary.

As illustrated in FIG. 2, a conductive belt (endless belt) 20 for an electrophotographic apparatus (hereinafter, referred to sometimes simply as the conductive belt 20) according to one embodiment of the present invention includes a conductive rubber elastic body layer 24. The conductive rubber elastic body layer 24 defines a base layer of the conductive belt 20. A surface layer or the like may be provided on the outer periphery of the conductive rubber elastic body layer 24 as necessary.

The conductive rubber elastic body layer of the present conductive member including the conductive roll 10 and the conductive belt 20 is made of a conductive rubber composition. The conductive rubber composition is vulcanized (cross-linked) by a predetermined vulcanized agent (cross-linking agent). The conductive rubber elastic body layer (conductive rubber composition) contains polar rubber, non-polar rubber, and a dispersing agent.

The polar rubber defines rubber having a polar group. Examples of the polar group include a chloro group, a nitrile group, a carboxyl group, and an epoxy group. Specific examples of the polar rubber include hydrin rubber, nitrile rubber (NBR), urethane rubber (U), acrylic rubber (a copolymer of acrylic acid ester and 2-chloroethyl vinyl ether, ACM), and chloroprene rubber (CR). Examples of the hydrin rubber include an epichlorohydrin homopolymer (CO), an epichlorohydrin-ethylene oxide binary copolymer (ECO), an epichlorohydrin-allylglycidylether binary copolymer (GCO), and an epichlorohydrin-ethylene oxide-allylglycidylether terpolymer (GECO). Among them, a single kind of polar rubber may be used alone, or two or more kinds of polar rubber may be used in combination. Among them, hydrin rubber, nitrile rubber (NBR), and chloroprene rubber are preferred from the viewpoint of a lower resistance.

The non-polar rubber defines rubber having no polar group. Examples of the polar group include a chloro group, a nitrile group, a carboxyl group, and an epoxy group. Examples of the non-polar rubber include natural rubber (NR), isoprene rubber (IR), hydrogenated isoprene rubber, butadiene rubber (BR), styrene-butadiene rubber (SBR), butyl rubber (IIR), ethylene-propylene rubber (EPM), ethylene-propylene-diene ternary copolymer rubber (EPDM), and silicone rubber (Q). Among them, a single kind of non-polar rubber may be used alone, or two or more kinds of non-polar rubber may be used in combination. Among them, natural rubber, isoprene rubber, hydrogenated isoprene rubber are preferred from the viewpoint that the conductive rubber elastic body layer can easily have a lower hardness and lower settling properties.

Specific examples of the dispersing agent include a polymer containing a block made of a polar rubber component and a block made of a non-polar rubber component, modified natural rubber, and modified isoprene rubber. Examples of the block made of a polar rubber component include a block made of a nitrile rubber component (NBR component). Examples of the block made of a non-polar rubber component include a block made of an isoprene rubber component (IR component). Examples of the polymer include a polymer containing a block made of a nitrile rubber component and a block made of an isoprene rubber component. Examples of the modified natural rubber include epoxidized natural rubber, chlorinated natural rubber, and nitrile-natural rubber (acrylonitrile-natural rubber). Examples of the modified isoprene rubber include epoxidized isoprene rubber, chlorinated isoprene rubber, nitrile-isoprene rubber (acrylonitrile-isoprene rubber), maleic acid-modified isoprene rubber, and (meth) acrylic acid-modified isoprene rubber. Among them, a single kind of a dispersing agent may be used alone, or two or more kinds of dispersing agents may be used in combination. Among them, epoxidized natural rubber and epoxidized isoprene rubber are particularly preferred from the viewpoint of having an especially excellent dispersion effect (effect to finely disperse the non-polar rubber).

The dispersing agent can finely disperse the non-polar rubber. Thus, the hardness and the elastic recovery rate of the conductive rubber elastic body layer linearly increase between the hardness and the elastic recovery rate of the polar rubber and the hardness and the elastic recovery rate of the non-polar rubber. Thus, while ensuring a low resistance required of a conductive member for an electrophotographic apparatus, the conductive rubber elastic body layer can achieve satisfying lower hardness and satisfying lower settling properties than a conventional conductive rubber elastic body layer.

From the viewpoint of being more excellent in the above-described effect, the combination of NBR, IR and epoxidized natural rubber is especially preferred as the combination of polar rubber, non-polar rubber, and a dispersing agent.

The content of the dispersing agent is preferably 0.1 parts by mass or more relative to total 100 parts by mass of the polar rubber and the non-polar rubber from the viewpoint of easily achieving a satisfying low hardness and satisfying low settling properties. The content is more preferably 0.5 parts by mass or more, and still more preferably 1.0 part by mass or more. On the other hand, the content is preferably 20 parts by mass or less relative to total 100 parts by mass of the polar rubber and the non-polar rubber from the viewpoint of easily securing a low resistance and a low hardness. The content is more preferably 15 parts by mass or less, and still more preferably 10 parts by mass or less.

As the content ratio between the polar rubber and the non-polar rubber, the polar rubber is preferably 20% by mass or more in the total of both from the viewpoint of easily securing a low resistance, and more preferably 30% by mass or more. In addition, the non-polar rubber is preferably 10% by mass or more from the viewpoint of achieving a satisfying low hardness and satisfying low settling properties, and more preferably 20% by mass or more. Thus, the content ratio between the polar rubber and the non-polar rubber is preferably, in parts by mass, within the range of 20:80 to 90:10 from the viewpoint that the conductive rubber elastic body layer can have a good balance among conductive properties, a low hardness, and low settling properties, and more preferably within the range of 30:70 to 80:20.

The conductive rubber elastic body layer (conductive rubber composition) contains a conductive agent as necessary from the viewpoint of a low resistance. Examples of the conductive agent include an ion conductive agent and an electroconductive agent. As the conductive agent, an ion conductive agent or an electroconductive agent that is added to a conductive rubber elastic body layer of a conductive member for an electrophotographic apparatus can be used.

Examples of the ion conductive agent include a quaternary ammonium salt, a quaternary phosphonium salt, a borate salt, and a surface acting agent. The content of the ion conductive agent is preferably within the range of 0.1 to 10 parts by mass relative to 100 parts by mass of the polar rubber from the viewpoints of a low resistance and bleeding. The content is more preferably within the range of 0.5 to 5.0 parts by mass.

Examples of the electroconductive agent include carbon black, graphite, potassium titanate, iron oxide, conductive titanium oxide, conductive zinc oxide, and conductive tin oxide. The content of the electroconductive agent is preferably within the range of 1.0 to 20 parts by mass relative to 100 parts by mass of the polar rubber from the viewpoints of a low resistance a low hardness, and low settling properties. The content is more preferably within the range of 5.0 to 15 parts by mass.

The conductive rubber elastic body layer (conductive rubber composition) contains a vulcanizing agent (cross-linking agent), a vulcanizing accelerator, a vulcanizing aid (cross-linking aid), and the like as necessary. In addition, the conductive rubber elastic body layer (conductive rubber composition) may contain one or more kinds of additives such as a bulking agent, a strengthening agent, a processing aid, an antioxidant, a plasticizer, an ultraviolet absorber, and a lubricant.

Examples of the vulcanizing agent (cross-linking agent) include sulfur and peroxide. Among the vulcanizing agents (cross-linking agents), peroxide is preferable from the viewpoint that the conductive rubber elastic body layer can have lower settling properties. The content of the peroxide is preferably within the range of 0.5 to 7 parts by mass relative to total 100 parts by mass of the polar rubber and the non-polar rubber from the viewpoint that the conductive rubber elastic body layer can have low settling properties. The content is more preferably within the range of 1.0 to 5 parts by mass.

The conductive rubber elastic body layer includes a first polymer phase containing the polar rubber and a second polymer phase containing the non-polar rubber, the second polymer phase being present separated from the first polymer phase. In the conductive rubber elastic body layer, the first polymer phase is preferably a continuous phase from the viewpoint of conductive properties. The second polymer phase may be a continuous phase or a dispersed phase (non-continuous phase).

The dispersed phase defines a phase in which the rubber dots in an island shape in the continuous phase. When the second polymer phase is a dispersed phase, the first polymer phase becomes a continuous phase that continues in both of a circumferential direction and a thickness direction of the conductive rubber elastic body layer, so that the conductive rubber elastic body layer easily secures conductive properties. When a conductive agent is contained from the viewpoints of conductive properties and a low resistance, the conductive agent may be contained only in the first polymer phase, or a reduced amount of the conductive agent may be contained in the second polymer phase. Thus, the content of the conductive agent required to obtain desired conductive properties can be reduced. In particular, reducing the content of the electroconductive agent can suppress rise in hardness, whereby a satisfying low hardness and satisfying low settling properties can be easily achieved. For this reason, the second polymer phase is preferably a dispersed phase.

When a conductive agent is contained from the viewpoints of conductive properties and a low resistance, it is preferable that the continuous phase made of the polar rubber should contain a larger amount of conductive agent than the continuous phase or the dispersed phase made of the non-polar rubber. Thus, the conductive rubber elastic body layer can easily have a reduced hardness while securing conductive properties.

In order to make the amount of the conductive agent to be contained in the phase made of the polar rubber different from the amount of the conductive agent to be contained in the phase made of the non-polar rubber, the conductive rubber composition has only to be prepared, for example, in a method of kneading the polar rubber with the conductive agent in advance, and then kneading the polar rubber containing the conductive agent with the non-polar rubber containing no conductive agent. Alternatively, the conductive rubber composition has only to be prepared, for example, in a method of adding the conductive agent to each of the polar rubber and the non-polar rubber in advance while a larger amount of the conductive agent is added to the polar rubber, and then kneading the polar rubber containing the larger amount of the conductive agent with the non-polar rubber containing the conductive agent.

By using a predetermined conductive rubber composition, the conductive rubber elastic body layer has excellent conductive properties, and achieves a satisfying low hardness and satisfying low settling properties. The conductive rubber elastic body layer preferably has a resistance value within the range of $1.0 \times 10^3$ to $1.0 \times 10^9 \Omega$ from the viewpoint of conductive properties. The conductive rubber elastic body layer preferably has an MD-1 hardness of 47 or less from the viewpoint that the conductive rubber elastic body layer has a lower hardness than that of a conventional conductive rubber elastic body layer, and more preferably has an MD-1 hardness of 45 or less. The conductive rubber elastic body layer preferably has an elastic recovery rate over 80% from the viewpoint that the conductive rubber elastic body layer has lower settling properties than those of a conventional conductive rubber elastic body layer, and more preferably has an elastic recovery rate of 85% or more. The MD-1 hardness is measured with the use of a cantilever leaf-spring loaded spring type hardness tester ("MICRO RUBBER DUROMETER/MD-1 TYPE" manufactured by KOBUN-SHI KEIKI CO., LTD.). The MD-1 hardness measurement values define values obtained by measuring rubber having a thickness of 1 to 2 mm. The elastic recovery rate is measured with the use of a micro hardness meter (FISCHERSCOPE H100C manufactured by FISCHER INSTRUMENTS K.K.) in accordance with the ISO 14577-1.

It is preferable that either one of the first polymer phase and the second polymer phase should be a conductive phase, and the other should be a non-conductive phase. The base rubber of the conductive phase may be polar rubber or non-polar rubber. The base rubber is preferably polar rubber from the viewpoint of conductive properties. When the base rubber is polar rubber, the conductive phase may have a conductive agent dispersed or not dispersed in its base rubber as long as desired conductive properties are satisfied. An ion conductive agent or an electroconductive agent is used as the above conductive agent depending on a conductive system (an ion conductive system, an electroconductive system). The conductive agent is preferably dispersed from the viewpoint that the conductive phase easily obtains desired conductive properties. When the base rubber is non-polar rubber, the conductive phase preferably has a conductive agent dispersed in its base rubber as long as desired conductive properties are satisfied.

The conductive rubber composition is prepared by blending to knead the composition constituting the conductive phase and the composition constituting the non-conductive phase, and optionally the above-described dispersing agent, vulcanizing agent (cross-linking agent), vulcanizing accelerator, vulcanizing aid (cross-linking aid), additives, and the like that are added as necessary. The composition constituting the conductive phase is prepared before preparing the conductive rubber composition by blending to knead in advance a matrix polymer with a conductive agent and additives that are added as necessary. In addition, the composition constituting the non-conductive phase is prepared before preparing the conductive rubber composition by blending to knead in advance a matrix polymer with additives that are added as necessary.

The conductive phase is preferably made of a composition having a volume resistivity of $1\times10^8$ Ω·cm or less from the viewpoint of conductive properties, more preferably a volume resistivity of $1\times10^6$ Ω·cm or less, and still more preferably a volume resistivity of $1\times10^5$ Ω·cm or less. The volume resistivity of the composition constituting the conductive phase can be measured in accordance with JIS K 6911 in a 23° C./53% RH environment by using a sheet-like sample obtained by molding the composition into a sheet. The conductive phase is preferably made of a composition containing a conductive agent from the viewpoint of conductive properties.

The non-conductive phase may have its base rubber be polar rubber or non-polar rubber if the non-conductive phase functions as a non-conductive phase. The base rubber is preferably non-polar rubber from the viewpoint of conductive properties. A conductive agent may be dispersed in the base rubber of the non-conductive phase if the non-conductive phase functions as a non-conductive phase; however, it is preferable that a conductive agent is not dispersed in the base rubber from the viewpoint of conductive properties. When an electroconductive agent is contained only in the conductive phase while not contained in the non-conductive phase, the amount of the electroconductive agent required to obtain desired conductive properties can be reduced because the non-conductive phase, which does not function as a conductive phase, contains no electroconductive agent. Thus, a lower hardness, lower settling properties, and a low cost are easily achieved.

The non-conductive phase preferably has a higher volume resistivity than that of the conductive phase from the viewpoint of conductive properties. The volume resistivity of the composition constituting the non-conductive phase can be measured in accordance with JIS K 6911 in a 23° C./53% RH environment by using a sheet-like sample obtained by molding the composition into a sheet in the same manner as the volume resistivity of the composition constituting the conductive phase. The non-conductive phase is preferably made of a composition containing no conductive agent from the viewpoint of conductive properties.

In the conductive phase of the conductive rubber elastic body layer, due to the contained electroconductive agent (conductive particles), the hardness increases, the elastic recovery rate decreases, and the compression set is degraded. In addition, due to poor dispersion of the contained electroconductive agent (conductive particles), resistance irregularity (deterioration in charging properties) occurs. In addition, due to the used polar rubber, the elasticity decreases. Thus, if the conductive rubber elastic body layer includes only the conductive phase, a low hardness and low settling properties could not be satisfied.

The non-conductive phase contains a smaller amount of conductive agent than the conductive agent contained in the conductive phase, or contains no conductive agent. In addition, the non-conductive phase contains a smaller amount of polar polymer than the polar polymer contained in the conductive phase, or contains no polar polymer. For this reason, the non-conductive phase is relatively excellent in flexibility. Thus, consisting of two phases of the conductive phase and the non-conductive phase, the conductive rubber elastic body layer can demonstrate a low hardness and low settling properties by having the non-conductive phase, which are not obtained by having only the conductive phase. As both of the conductive phase and the non-conductive phase are more finely dispersed, a lower hardness and lower settling properties are demonstrated.

Figure 3:
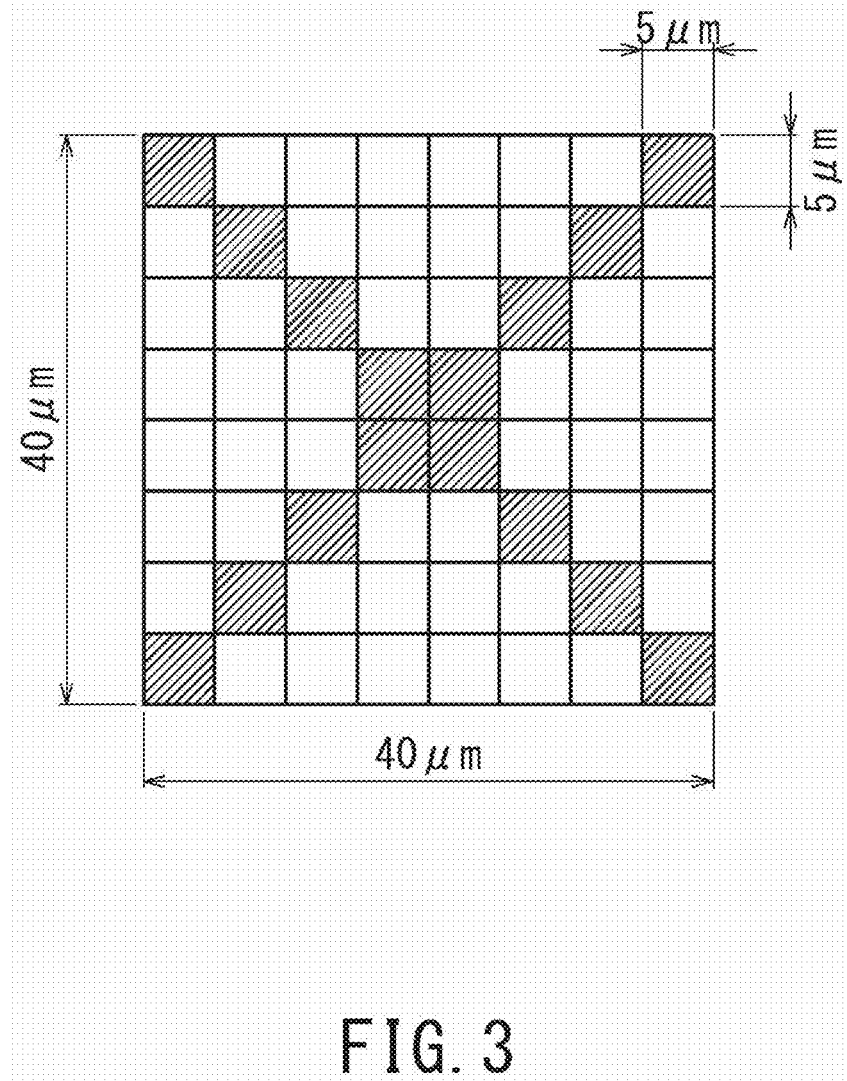
FIG. 3 is schematic diagram showing how to measure the area ratios of both of a conductive phase and a non-conductive phase in a conductive rubber elastic body layer.

In the conductive rubber elastic body layer consisting of two phases of the conductive phase and the non-conductive phase, the conductive phase preferably has an area ratio within the range of 10 to 90% in an arbitrarily selected region of a five-μm square (five μm×five μm) in the conductive rubber elastic body layer. In addition, the non-conductive phase preferably has an area ratio within the range of 90 to 10%. The above "arbitrarily selected region" means any region. The area ratio between the conductive phase and the non-conductive phase defines an area ratio in an arbitrarily selected region of a five-μm square, and is specifically obtained as follows. As illustrated in FIG. 3, a given cross section of the conductive rubber elastic body layer is observed, an arbitrarily selected region of 40×40 μm in the cross section is divided into 64, the shaded 16 squares that are arranged in oblique directions are selected, and the area ratio of the conductive phase (non-conductive phase) in each five×five μm square is calculated, and based on the values that 14 squares or more among the selected 16 squares (8.5 or more out of 10) have, the area ratio is determined.

When the conductive phase and the non-conductive phase are uniformly dispersed at a toner size level (finely dispersed) such that both the phases are present at a predetermined ratio in an arbitrarily selected region of a five-μm square in the conductive rubber elastic body layer, charge control at a toner size level can be performed, and thus the conductive rubber elastic body layer demonstrates excellent charging properties. When the area ratio of the conductive phase in an arbitrarily selected region of a five-μm square is less than 10%, the ratio of the non-conductive phase is too large, and the conductive phase accordingly has poor dispersibility. For this reason, the dispersibility of the electroconductive agent in the conductive rubber elastic body layer is poor because the dispersibility is significantly affected by agglomeration (dispersibility) of the electroconductive agent in the conductive phase. Thus, resistance irregularity occurs to deteriorate the charging properties. When the area ratio of the conductive phase in an arbitrarily selected region of a five-μm square is more than 90%, the ratio of the conductive phase is too large, and the conductive phase is not dispersed at a toner size level. For this reason, the dispersibility of the electroconductive agent in the conductive rubber elastic body layer is poor because the dispersibility is significantly affected by agglomeration (dispersibility) of the electroconductive agent in the conductive phase significantly affects. Thus, resistance irregularity occurs to deteriorate the charging properties.

When the area ratio of the conductive phase in an arbitrarily selected region of a five-μm square is in the range of 20 to 80%, the conductive rubber elastic body layer demonstrates more excellent charging properties. The area ratio of the conductive phase is preferably in the range of 30 to 70% from the viewpoint of excellent charging properties, and more preferably in the range of 40 to 60%.

In order that both the phases of the conductive phase and non-conductive phase are uniformly dispersed (finely dispersed) at a toner size level as described above, it is considered to use, for example, a method for using a dispersing agent for improving the dispersibility of both the phases of the conductive phase and non-conductive phase, a method for adjusting the mixing ratio between the matrix polymer of the conductive phase and the matrix polymer of the non-conductive phase, a method for sufficiently kneading until a desired degree of dispersion is obtained, and the like.

The present conductive member preferably has a resistance within the range of $1\times10^2$ to $1\times10^9\Omega$ when a voltage of 10 V is applied. This is because a satisfying low hardness and satisfying low settling properties can be easily achieved while conductive properties required of a conductive member for an electrophotographic apparatus is secured. The low hardness and the low settling properties are influenced by the electroconductive agent, the polar rubber, and the like that are contained in the conductive rubber elastic body layer in order to achieve a low resistance. From the viewpoint of conductive properties, the present conductive member more preferably has a resistance of $1\times10^7\Omega$ or less when a voltage of 10 V is applied, and still more preferably has a resistance of $1\times10^6\Omega$ or less. From the viewpoint of a low hardness and low settling properties, the present conductive member more preferably has a resistance of $1\times10^3\Omega$ or more when a voltage of 10 V is applied, and still more preferably has a resistance of $1\times10^4\Omega$ or more.

Figure 4A:
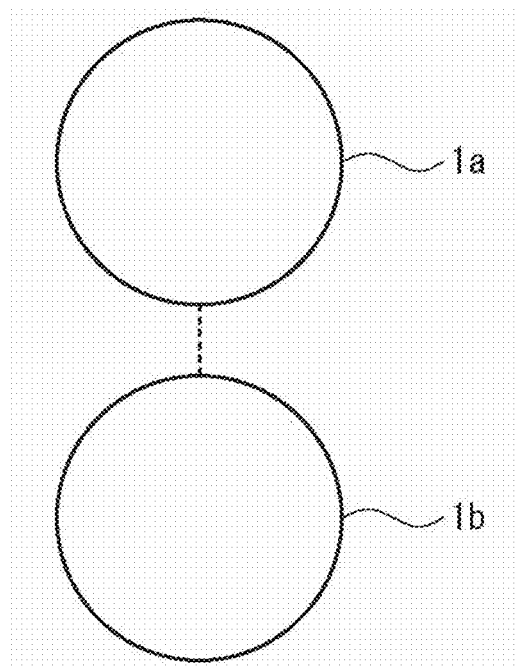
FIGS. 4A-4B are schematic diagrams of one example of the particle shape of an electroconductive agent, where
Figure 4B:
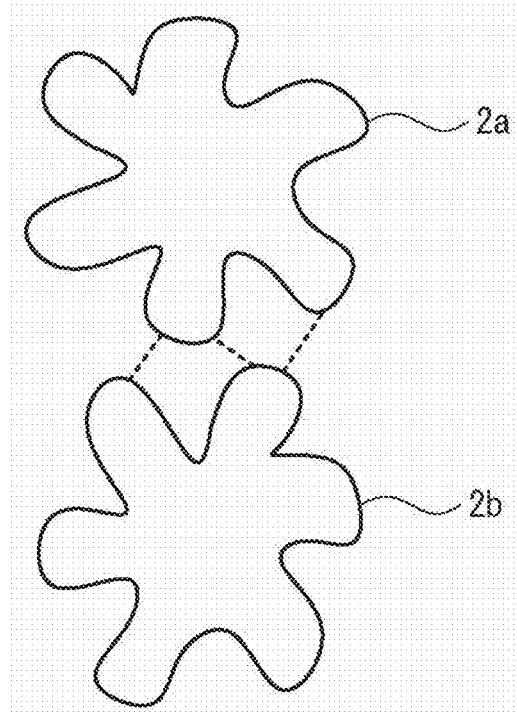

The electroconductive agent consists of conductive particles. For this reason, the specific surface area affects conductive performance. In the case of the particles $1a$ and $1b$ having a small surface asperity, the shape approximate to a spherical shape, and a relatively small specific surface area, the conduction path between the particle $1a$ and the particle $1b$ is at one location where the particle $1a$ is close to the particle $1b$ as indicated by the dotted line in FIG. 4A. Meanwhile, in the case of the particles $2a$ and $2b$ having a large surface asperity, a non-spherical shape, and a relatively large specific surface area, the conduction paths between the particle $2a$ and the particle $2b$ are at a plurality of locations (three locations) where the particle $2a$ is close to the particle $2b$ as indicated by the dotted lines as illustrated in FIG. 4B. In view of the above, the particles that have a relatively large specific surface area while having similar particle sizes are more excellent in conductive performance. Thus, from the viewpoint of conductive performance, it is preferable to use an electroconductive agent having a relatively large specific surface area. As the specific surface area is larger, the electroconductive agent is more agglomerated to be likely to be reduced in dispersibility. In the present conductive member, since the conductive phase itself, in which the electroconductive agent is dispersed, is highly dispersed (finely dispersed) in the conductive rubber elastic body layer, the agglomeration of the electroconductive agent has a small influence on the dispersibility of the electroconductive agent in the conductive rubber elastic body layer, and thus an electroconductive agent having a large specific surface area can also be highly dispersed in the conductive rubber elastic body layer.

The electroconductive agent preferably has a specific surface area of 150 m²/g or more from the viewpoint of conductive performance (low resistance), more preferably a specific surface area of 180 m²/g or more, and still more preferably a specific surface area of 500 m²/g or more. On the other hand, the electroconductive agent preferably has a specific surface area of 1500 m²/g or less from the viewpoint that agglomeration of the electroconductive agent can be suppressed to achieve excellent dispersibility, more preferably a specific surface area of 1400 m²/g or less, and still more preferably a specific surface area of 1200 m²/g or less. When using an electroconductive agent having a specific surface area within the range of 150 to 1500 m²/g, which is a relatively large specific surface area, the electroconductive agent is more excellent in conductive performance, and thus the amount of the electroconductive agent required in order to obtain desired conductive properties can be reduced, whereby a low hardness and low settling properties can be easily secured.

Within the above-described range of the specific surface area, the content of the electroconductive agent in the conductive phase of the electroconductive system is preferably six parts by mass or more relative to 100 parts by mass of the base rubber in the conductive phase from the viewpoint of conductive properties (low resistance), more preferably seven parts by mass or more, and still more preferably eight parts by mass or more. On the other hand, the content is preferably 40 parts by mass or less relative to 100 parts by mass of the base rubber in the conductive phase from the viewpoints of a low hardness and low settling properties, more preferably 35 parts by mass or less, and still more preferably 30 parts by mass or less.

Examples of the electroconductive agent include carbon black, graphite, potassium titanate, iron oxide, conductive titanium oxide, conductive zinc oxide, and conductive tin oxide. Among them, carbon black and graphite are preferred from the viewpoint of conductive properties.

The conductive rubber elastic body layer preferably include an interface phase between the first polymer phase and the second polymer phase, the interface phase containing the dispersing agent. By including the interface phase, the dispersing agent that appears on the surface of the conductive rubber elastic body layer is reduced, which suppresses contamination caused by the dispersing agent.

Figure 5A:
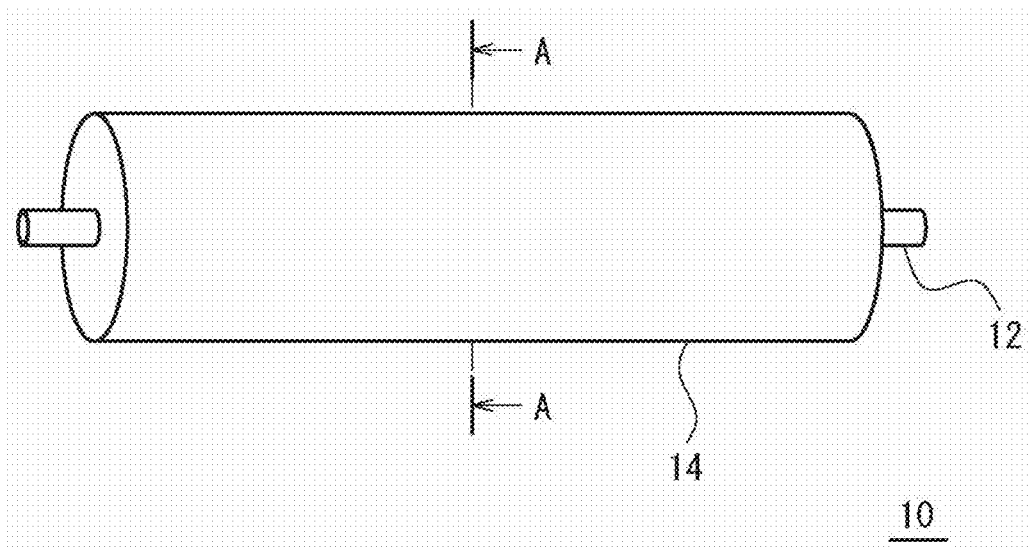
FIG. 5A is an external schematic diagram of a conductive roll for an electrophotographic apparatus according to one embodiment of the present invention.
Figure 5B:
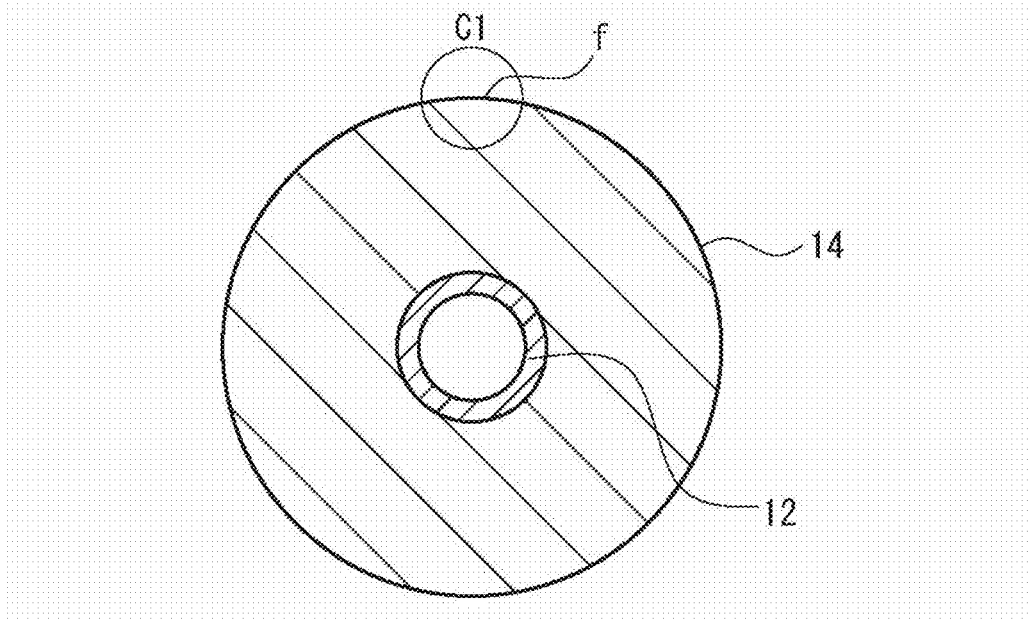
FIG. 5B is a cross-sectional view of the same along the line A-A of FIG. 5A.
Figure 6A:
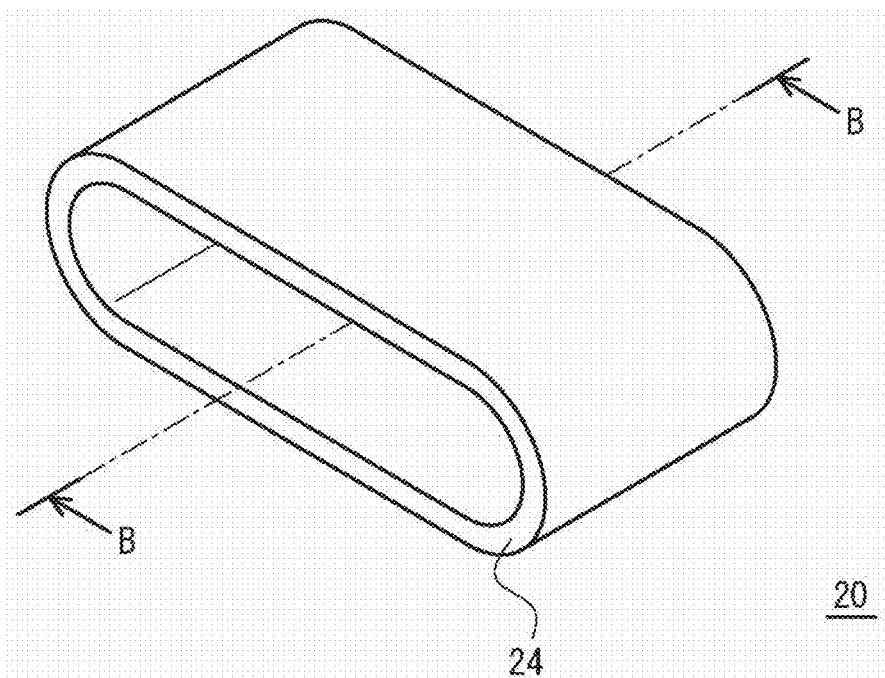
FIG. 6A is an external schematic diagram of a conductive belt (endless belt) for an electrophotographic apparatus according to one embodiment of the present invention.
Figure 6B:
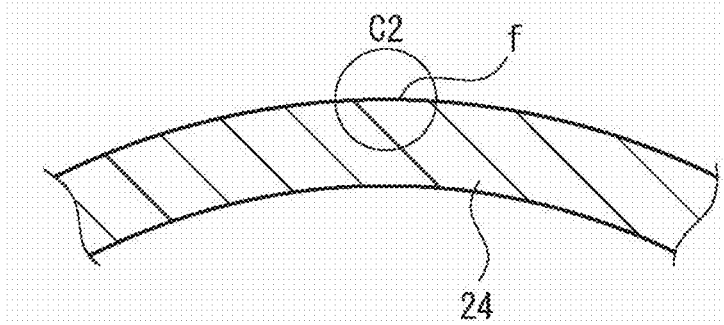
FIG. 6B is a cross-sectional view of the same along the line B-B of FIG. 6A.

FIG. 5 illustrate a conductive roll for an electrophotographic apparatus according to one embodiment of the present invention, and FIG. 6 illustrate a conductive belt (endless belt) for an electrophotographic apparatus according to one embodiment of the present invention.

As illustrated in FIG. 5, a conductive roll 10 for an electrophotographic apparatus (hereinafter, referred to sometimes simply as the conductive roll 10) according to one embodiment of the present invention includes a shaft body 12, and a conductive rubber elastic body layer 14 provided on the outer periphery of the shaft body 12. The conductive rubber elastic body layer 14 defines a base layer of the conductive roll 10. A resistance adjusting layer, a surface layer, or the like may be provided on the outer periphery of the conductive rubber elastic body layer 14 as necessary.

As illustrated in FIG. 6, a conductive belt (endless belt) 20 for an electrophotographic apparatus (hereinafter, referred to sometimes simply as the conductive belt 20) according to one embodiment of the present invention includes a conductive rubber elastic body layer 24. The conductive rubber elastic body layer 24 defines a base layer of the conductive belt 20. A surface layer or the like maybe provided on the outer periphery of the conductive rubber elastic body layer 24 as necessary.

Figure 7:
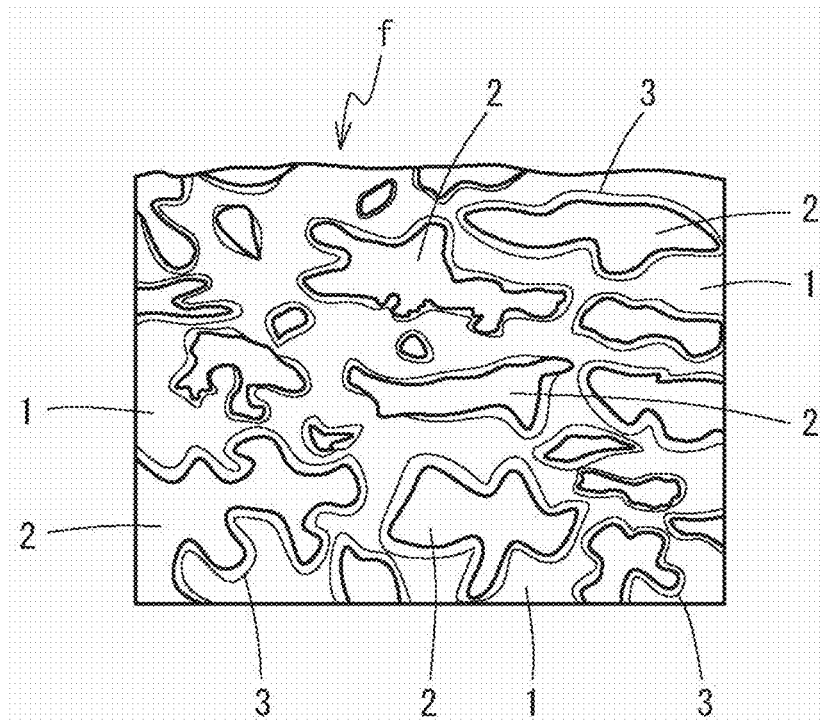
FIG. 7 is a schematic diagram of an enlarged phase configuration illustrating the C1 portion in FIG. 5 and the C2 portion in FIG. 6.

FIG. 7 illustrates an enlarged phase configuration illustrating the C1 portion in FIG. 5 and the C2 portion in FIG. 6. Illustrated in FIG. 7 is a configuration of the conductive rubber elastic body layer that includes, between the first polymer phase and the second polymer phase, an interface phase containing the dispersing agent. The conductive rubber elastic body layer includes a first polymer phase 1, a second polymer phase 2 being present separated from the first polymer phase 1, and an interface phase 3 being present between the first polymer phase 1 and the second polymer phase 2 as illustrated in FIG. 7. The first polymer phase 1 defines the above-described first polymer phase, and the second polymer phase 2 defines the above-described second polymer phase. The first polymer phase 1 is, for example, a conductive phase, and the second polymer phase 2 is, for example, a non-conductive phase.

FIG. 7 illustrates the first polymer phase 1 as a continuous phase (a sea phase), the second polymer phase 2 as a dispersed phase (a non-continuous phase, an island phase), and the interface phase 3 as a dispersed phase that continuously covers the periphery of the second polymer phase 2. The interface phase 3 is a dispersed phase that continuously covers the entire periphery of the second polymer phase 2a or continuously covers a portion of the periphery of the second polymer phase 2.

The interface phase 3 contains a dispersing agent. The dispersing agent has a role as a surface acting agent, and, for example, prevents phase separation between the first polymer phase 1 and the second polymer phase 2, for example, during the production process. The dispersing agent has an affinity for each of the phases that are not mixed together, and thus could be contained also in each of the phases. When contained a lot in the first polymer phase 1 or the second polymer phase 2, the dispersing agent appears a lot on a surface F of the present conductive member (a roll surface or a belt surface). In such a case, contamination such as toner adhesion and sensitive material contamination easily occurs. In the present conductive member, it is preferable to use a dispersing agent that is likely to be unevenly distributed between the first polymer phase 1 and the second polymer phase 2. The interfacial phase 3 is formed in this manner. Since the dispersing agent is present in the interface phase 3 between the first polymer phase 1 and the second polymer phase 2, the dispersing agent that appears on the surface f of the conductive rubber elastic body layer is reduced, which suppresses contamination caused by the dispersing agent.

The interface phase 3 preferably has a thickness within the range of 10 to 1000 nm. This is because the dispersing agent is contained in an appropriate amount, and properties of a low hardness and low settling properties are easily demonstrated by the two phases of the first polymer phase 1 and the second polymer phase 2. When the interface phase 3 has a sufficient thickness, the amount of the dispersing agent can be reduced. The interface phase 3 more preferably has a thickness within the range of 10 to 500 nm from the viewpoint that the properties of a low hardness and low settling properties are more greatly demonstrated by the two phases, still more preferably a thickness within the range of 10 to 300 nm, and particularly preferably a thickness within the range of 10 to 200 nm. The thickness of the interface phase 3 is adjustable by controlling the affinities of the dispersing agent to both the phases (the first polymer phase 1 and the second polymer phase 2) and the amount of the dispersing agent.

Figure 8:
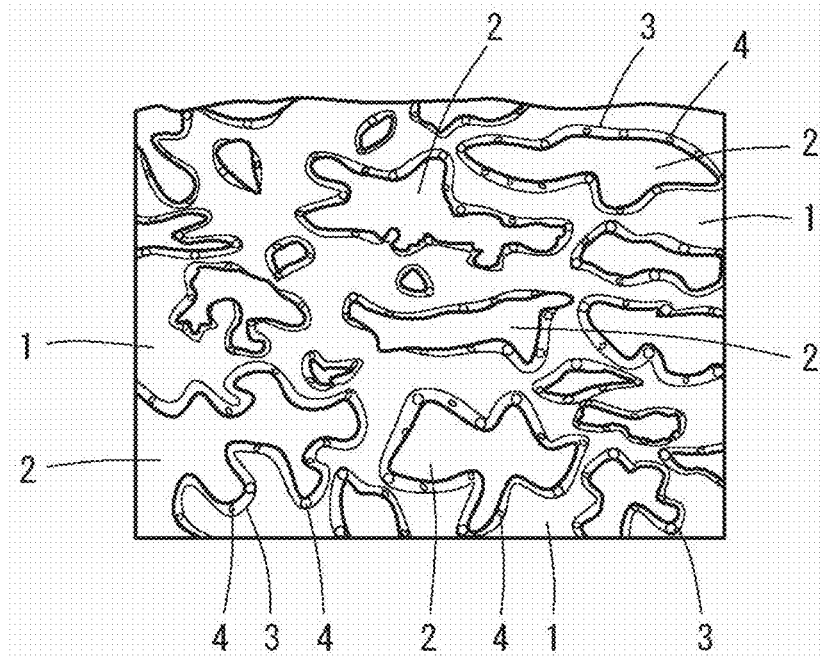
FIG. 8 is a schematic diagram of another phase configuration according to another embodiment of the present invention.

Peroxide used as a vulcanizing agent (cross-linking agent) maybe used by being carried on a carrier such as calcium carbonate. In this case, a carrier such as calcium carbonate remains in the conductive rubber composition. As illustrated in FIG. 8, collecting a carrier 4 such as calcium carbonate in the interface phase 3 containing the dispersing agent reduces the amount of the carrier 4 such as calcium carbonate that is present in the first polymer phase 1 and the second polymer phase 2, whereby the properties of the first polymer phase 1 and the second polymer phase 2 are more easily demonstrated. For this reason, it is better to select the types or the like of the dispersing agent as appropriate and collect the carrier 4 such as calcium carbonate in the interface phase 3 containing the dispersing agent.

The thickness of the conductive rubber elastic body layer is not particularly limited; however, the conductive rubber elastic body layer is formed in general so as to have a thickness of 0.1 to 10 mm, and preferably a thickness of 1 to 5 mm. The conductive rubber elastic body layer may be a solid non-foamed body, or may be a sponge-like foamed body.

The conductive roll 10 can be produced as follows, for example. First of all, an adhesive composition is applied on the outer periphery of the shaft body 12 as necessary. Then, the conductive rubber composition is molded in layers on the outer periphery of the applied adhesive composition. The molding of the conductive rubber composition can be performed by extrusion molding or die forming. The conductive rubber composition is cross-linked/cured by heating or the like at the time of extrusion molding or die forming. Thus, the conductive roll 10 including the conductive rubber elastic body layer 14 on the outer periphery of the shaft body 12 is obtained.

A surface layer may be formed on the outer periphery of the conductive rubber elastic body layer 14 as necessary for the purpose of protecting the surface of the conductive rubber elastic body layer 14 or the purpose of imparting surface properties (low frictional properties, releasing properties, electric charge properties, and the like) of the conductive roll 10. In addition, an intermediate layer such as a resistance adjusting layer for adjusting the resistance of the entire conductive roll 10 may be formed on the outer periphery of the conductive rubber elastic body layer 14 under the surface layer.

The surface layer is mainly made from, but is not limited to, a polyamide (nylon) based polymer, an acrylic based polymer, a urethane based polymer, a silicone based polymer, and a fluorine based polymer. These polymers may be modified. Examples of the modifying group include an N-methoxymethyl group, a silicone group, and a fluorine group.

Conventionally known conductive agents such as carbon black, graphite, c-$TiO_2$, c-ZnO, c-$SnO_2$ (c— indicates conductive properties), and ion conductive agents (a quaternary ammonium salt, a borate salt, a surface acting agent, and the like) may be added as appropriate to the surface layer in order to impart conductive properties thereto. In addition, various kinds of additives may be added as appropriate to the surface layer as necessary.

A surface layer-forming composition is used in order to form a surface layer. The surface layer-forming composition consists of the above-described main material, a conductive agent, and other additives to be contained as necessary. Examples of the additives include a lubricant, a vulcanizing accelerator, an age inhibitor, a light stabilizer, a viscosity modifier, a processing aid, a flame retardant, a plasticizer, a foaming agent, a filler, a dispersing agent, a defoaming agent, a pigment, and a mold-releasing agent.

The surface layer-forming composition may contain solvents including organic solvents such as methyl ethyl ketone, toluene, acetone, ethyl acetate, butyl acetate, methyl isobutyl ketone (MIBK), THF, and DMF, and water-soluble solvents such as methanol and ethanol as appropriate from the viewpoint of adjusting the viscosity.

The surface layer can be formed by a method for coating the surface layer-forming composition on the outer periphery of the conductive rubber elastic body layer 14, or the like. Examples of the coating method include various kinds of coating methods such as a roll coating method, a dipping method, and a spray coating method. The coated surface layer may be subjected to ultraviolet irradiation or a heat treatment as necessary.

The surface layer in general has a thickness of 0.01 to 100 μm, 0.1 to 20 μm, or 0.3 to 10 μm. The surface layer in general has a volume resistivity of $10^4$ to $10^9$ Ω·cm, $10^5$ to $10^8$ Ω·cm, or $10^6$ to $10^7$ Ω·cm.

Instead of forming a surface layer, it is also possible to apply surface modification on an intermediate layer like the conductive rubber elastic body layer 14 or the resistance adjusting layer to provide it with the surface properties equal to those obtained by forming a surface layer. Examples of the surface modification method include a method for applying UV or an electron beam, and a method for bringing the surface into contact with a surface modifying agent capable of reacting with an unsaturated bond or halogen in the base layer, for example, a compound containing a reactive group such as an isocyanate group, a hydrosilyl group, an amino group, a halogen group, and a thiol group.

The conductive belt 20 can be formed by applying he conductive rubber composition on the surface of a mold (cylindrical base body) by a coating method such as spray coating, heating the composition at a predetermined temperature (preferably 150 to 300° C.), and drying the composition for a predetermined time (preferably three to six hours). A surface layer may be formed on the outer periphery of the conductive rubber elastic body layer 24 as necessary for the purpose of protecting the surface of the conductive rubber elastic body layer 24 or the purpose of imparting surface properties (low frictional properties, releasing properties, electric charge properties, and the like) of the conductive belt 20. The surface layer is made from a silicone based resin, a fluorine based resin, a urethane based resin, an acrylic based resin, and a polyamide based resin.

While the embodiments of the present invention have been described in detail, the present invention is not limited to the above-described embodiments, and various modifications can be made without departing from the gist of the present invention. For example, while the conductive rubber elastic body layer is illustrated as a base layer of a conductive roll in FIG. 1, the conductive rubber elastic body layer may be a surface layer. Similarly, while the conductive rubber elastic body layer is illustrated as a base layer of a conductive belt in FIG. 2, the conductive rubber elastic body layer may be a surface layer.

In addition, while the first polymer phase 1 is illustrated as a continuous phase (a sea phase) and the second polymer phase 2 is illustrated as a dispersed phase (a non-continuous phase, an island phase) in FIGS. 7 and 8, the first polymer phase 1 may be a dispersed phase (a non-continuous phase, an island phase) and the second polymer phase 2 may be a continuous phase (a sea phase). In this case, the interface phase 3 is a dispersed phase that continuously covers the periphery of the first polymer phase 1. Alternatively, both of the first polymer phase 1 and the second polymer phase 2 may be continuous phases (sea phases).

EXAMPLE

Hereinafter, the present invention will be described in detail with reference to Examples, but the present invention is not limited to these configurations.

Examples A1 to A17, Comparative Examples A1 to A6

Detailed descriptions of the used materials are provided below.

(Polar Rubber)
Nitrile rubber (NBR): "N237H" manufactured by JSR CORPORATION
Hydrin rubber (ECO): "Hydrin 13106" manufactured by ZEON CORPORATION
Chloroprene rubber (CR): ["SHOWA DENKO CHLOROPRENE GW" manufactured by SHOWA DENKO K.K.]
(Non-Polar Rubber)
Isoprene rubber (IR): "JSR IR2200" manufactured by JSR CORPORATION
Natural rubber (NR): "RSS1"
Hydrogenated isoprene (hydrogenated IR): "L-IR290" manufactured by KURARAY CO., LTD.
(Dispersing Agent)
Dispersing agent (1): a reaction product of maleic acid-modified IR and both terminals amine-modified NBR
Dispersing agent (2): a block copolymer of NBR and IR
Dispersing agent (3): epoxy-modified NR ("EPDXYPRENE 50" manufactured by MUANG MAI GUTHRIE PUBLIC COMPANY LIMITED)
Dispersing agent (4): epoxy-modified IR, a synthetic product
Dispersing agent (5): nitrile-modified NR, a synthetic product
(Conductive Agent)
Ion conductive agent: tetrabutylammonium bromide, "TBAB-100" manufactured by LION AKZO CO., LTD.
Carbon black (electroconductive agent): "DENKA BLACK" manufactured by DENKA COMPANY LIMITED.
(Vulcanizing agent, vulcanizing accelerator)
Peroxide: "PERCUMYL D40" manufactured by NOF CORPORATION.
Sulfur (vulcanizing agent)
Vulcanizing accelerator (1): sulfenamide based, "NOCCELER MSA" manufactured by OUCHI SHINKO CHEMICAL INDUSTRIAL CO., LTD.
Vulcanizing accelerator (2): thiuram-based, "NOCCELER TOT-N" manufactured by OUCHI SHINKO CHEMICAL INDUSTRIAL CO., LTD.

<Preparation of Conductive Rubber Compositions>
Conductive rubber compositions were prepared by blending polar rubber, non-polar rubber, dispersing agents, conductive agents, vulcanizing agents (cross-linking agents), and vulcanizing accelerators in accordance with the composition (mass ratios) indicated in Tables 1 to 3, and stirring to mix each of the resultant mixtures with the use of a stirring machine.

<Preparation of Conductive Rolls>
Core bars (6 mm in diameter) were set on the central axes of molding dies having a cylindrical molding cavity of 9 mm in diameter, and the conductive rubber compositions were each injected into the molding dies. The conductive rubber compositions were heated/cross-linked at 160° C. for 30 minutes, and cooled to be released from the dies to form conductive rubber elastic body layers that have a thickness of 1.5 mm on the outer peripheries of the core bars. Conductive rolls were prepared in this manner.

The elastic recovery rates, the MD-1 hardnesses, and the resistance values of the obtained conductive rubber elastic body layers of the conductive rolls were measured. In addition, the product properties including setting properties, antifogging properties, and image densities of the obtained conductive rubber elastic body layers of the conductive rolls were evaluated. The setting properties are affected by the settling properties of the conductive rubber elastic body layers. The antifogging properties are affected by the hardnesses of the conductive rubber elastic body layers. The image densities are affected by the resistance values (conductive properties) of the conductive rubber elastic body layers.

(Elastic Recovery Rate)

The surfaces of the conductive rubber elastic body layers were measured under the following measurement conditions to determine the ηIT [%] with the use of a micro hardness meter (FISCHERSCOPE H100C manufactured by FISCHER INSTRUMENTS K.K.) in accordance with the ISO 14577-1. To be specific, when the indenter is pushed into the surface of a material with the use of the micro hardness meter while the test load is kept constant, only a small portion of the total mechanical workload, Wtotal, of the dent, which is indicated during the push-in work, is consumed as a plastic deformation workload, Wplast, of the dent. The remaining portion is released as an elastic restoration deformation workload, Welast, of the dent when the test load is removed. Defining this mechanical workload as W=∫Fdh, the relation is indicated as follows. The conductive rubber elastic body layers having an elastic recovery rate of 85% or more were regarded as having low settling properties while the conductive rubber elastic body layers having an elastic recovery rate less than 85% were regarded as having high settling properties.

$$\eta IT\ [\%] = Welast/Wtotal$$

where Wtotal=Welast+Wplast.

<Measurement Conditions>

Indenter: a pyramid shape diamond indenter having a facing angle of 136 degrees
Initial load: 0 mN
Push-in maximum load: 20 mN (constant load)
Time reaching the maximum load: 0.25 to 10 sec
Time holding the maximum load: 5 sec
Unloading time: 0.25 to 10 sec
Measurement temperature: 25° C.

(MD-1 Hardness (Micro Rubber Hardness))

Measurement was performed with the use of a cantilever leaf-spring loaded spring type hardness tester ("MICRO RUBBER DUROMETER/MD-1 TYPE" manufactured by KOBUNSHI KEIKI CO., LTD.) by bringing the tip of the push needle of the hardness tester into contact with the surface of the axially central portion of the conductive rubber elastic body layer of each of the held conductive rolls, further applying pressure vertically to each of the surfaces with a load of 33.85 g with the use of the tester, and immediately reading the scale. The conductive rubber elastic body layers having an MD-1 hardness of 45% or less were regarded as having a low hardness while the conductive rubber elastic body layers having an MD-1 hardness higher than 45% were regarded as having a high hardness.

(Resistance Value)

While both ends of each conductive roll were pressed against a metal roll (diameter: 30 mm) at a predetermined load, the metal roll was rotated at a predetermined rotational speed, whereby each of the conductive rolls was corotated. While maintaining this state (while the metal roll and each of the conductive rolls were corotated), a voltage of 300 V was placed between the ends of each of the conductive rolls and the metal roll, and the carried current values were measured to determine electrical resistance values (roll resistance: Ω). The conductive rubber elastic body layers having a volume resistivity of $1\times10^9\Omega$ were regarded as having a high resistance while the conductive rubber elastic body layers having a volume resistivity within the range of $1\times10^3\Omega$ to $1\times10^9\Omega$ were regarded as having a low resistance.

(Setting Properties)

Each of the conductive rolls was mounted on a cartridge, and sealed to be left in a normal temperature and normal humidity environment for 14 days. Then, imaging was performed in a normal temperature and normal humidity environment. Images having a streak-like flaw were rated "failed" while images having no streak-like flaw were rated "passed". In addition, the roundness of each of the conductive rubber elastic body layers was measured with the use of a RONDCOM, and based on the amounts of the dents with respect to the roundness, the settling amounts were measured. The conductive rubber elastic body layers having a settling amount of 5 μm or less were regarded as having low settling properties while the conductive rubber elastic body layers having a settling amount more than 5 μm were regarded as having high settling properties. Among the conductive rubber elastic body layers having setting properties rated "passed", the conductive rubber elastic body layers having a settling amount of 2 μm or less were rated "excellent".

(AntiFogging Properties)

Each of the conductive rolls was mounted on a cartridge, and white solid images were printed. Image densities were measured with the use of a white photometer. Images having its given nine points within the range of 1.40 to 1.46 were rated as having "good" antifogging properties while images having its given nine points out of the range were rated as having "poor" antifogging properties. Among the images rated as having "good" antifogging properties, the images having its given nine points within the range of 1.43 to 1.45 were rated as having "excellent" antifogging properties.

(Image Density)

Each of the conductive rolls was mounted on a cartridge, and black solid images were printed. Image densities were measured with the use of a white photometer. Images having a white luminosity at its given nine points within the range of 1.0 to 2.0 were rated as having a "good" image density while images having a white luminosity at its given nine points out of the range were rated as having a "poor" image density. Among the images rated as having a "good" image density, the images having a white luminosity at its given nine points within the range of 1.3 to 1.6 were rated as having an "excellent" image density.

TABLE 1

| | | Example A | | | | | | | | |
|---|---|---|---|---|---|---|---|---|---|---|
| | | 1 | 2 | 3 | 4 | 5 | 6 | 7 | 8 | 9 |
| | NBR | 50 | 50 | 50 | 50 | 50 | 50 | — | — | — |
| | ECO | — | — | — | — | — | — | 50 | — | 50 |
| | CR | — | — | — | — | — | — | — | 50 | — |
| | IR | 50 | 50 | 50 | 50 | 50 | — | 50 | 50 | — |
| | NR | — | — | — | — | — | 50 | — | — | — |
| | Hydrogenated IR | — | — | — | — | — | — | — | — | 50 |
| | Dispersing agent (1) | 5 | — | — | — | — | — | — | — | — |
| | Dispersing agent (2) | — | 5 | — | — | — | — | — | — | — |
| | Dispersing agent (3) | — | — | 5 | — | — | 5 | 5 | 5 | 5 |
| | Dispersing agent (4) | — | — | — | 5 | — | — | — | — | — |
| | Dispersing agent (5) | — | — | — | — | 5 | — | — | — | — |
| | Ion conductive agent | 1 | 1 | 1 | 1 | 1 | 1 | 1 | 1 | 1 |
| | Carbon black | — | — | — | — | — | — | — | — | — |
| | Peroxide vulcanizing agent | 3 | 3 | 3 | 3 | 3 | 3 | 3 | 3 | 3 |
| | Sulfur | — | — | — | — | — | — | — | — | — |
| | Vulcanizing accelerator (1) | — | — | — | — | — | — | — | — | — |
| | Vulcanizing accelerator (2) | — | — | — | — | — | — | — | — | — |
| Physical properties | Elastic recovery rate (%) | 90 | 85 | 93 | 91 | 85 | 88 | 85 | 85 | 85 |
| | MD-1 hardness | 40 | 43 | 38 | 39 | 40 | 45 | 40 | 45 | 30 |
| Evaluation | Resistance value (Ω) | $3.0 \times 10^8$ | $3.0 \times 10^8$ | $6.0 \times 10^8$ | $6.0 \times 10^8$ | $3.0 \times 10^8$ | $3.0 \times 10^8$ | $5.0 \times 10^7$ | $5.0 \times 10^8$ | $5.0 \times 10^7$ |
| | Settling amount (μm) | 2.8 | 4.0 | 2.0 | 2.3 | 4.0 | 3.8 | 4.0 | 39 | 4.7 |
| | Setting properties | Passed | Passed | Excellent | Passed | Passed | Passed | Passed | Passed | Passed |
| | Antifogging properties | Good | Good | Excellent | Good | Good | Good | Good | Good | Good |
| | Image density | Excellent | Excellent | Excellent | Excellent | Excellent | Excellent | Excellent | Excellent | Excellent |

TABLE 2

| | | Example A | | | | | | | |
|---|---|---|---|---|---|---|---|---|---|
| | | 10 | 11 | 12 | 13 | 14 | 15 | 16 | 17 |
| | NBR | 50 | 50 | 50 | 50 | 90 | 20 | 50 | 50 |
| | ECO | — | — | — | — | — | — | — | — |
| | CR | — | — | — | — | — | — | — | — |
| | IR | 50 | 50 | 50 | 50 | 10 | 80 | 50 | 50 |
| | NR | — | — | — | — | — | — | — | — |
| | Hydrogenated IR | — | — | — | — | — | — | — | — |
| | Dispersing agent (1) | — | — | — | — | — | — | — | — |
| | Dispersing agent (2) | — | — | — | — | — | — | — | — |
| | Dispersing agent (3) | 0.1 | 15 | 20 | 5 | 5 | 5 | 5 | 5 |
| | Dispersing agent (4) | — | — | — | — | — | — | — | — |
| | Dispersing agent (5) | — | — | — | — | — | — | — | — |
| | Ion conductive agent | 1 | 1 | 1 | 1 | 1 | 1 | 1 | 1 |
| | Carbon black | — | — | — | 10 | — | — | — | 10 |
| | Peroxide vulcanizing agent | 3 | 3 | 3 | 3 | 3 | 3 | — | — |
| | Sulfur | — | — | — | — | — | — | 1 | 1 |
| | Vulcanizing accelerator (1) | — | — | — | — | — | — | 1 | 1 |
| | Vulcanizing accelerator (2) | — | — | — | — | — | — | 1 | 1 |
| Physical properties | Elastic recovery rate (%) | 85 | 95 | 96 | 85 | 85 | 90 | 89 | 85 |
| | MD-1 hardness | 40 | 44 | 45 | 45 | 45 | 33 | 38 | 43 |
| Evaluation | Resistance value (Ω) | $1.0 \times 10^8$ | $8.0 \times 10^8$ | $1.0 \times 10^9$ | $1.0 \times 10^5$ | $7.0 \times 10^7$ | $9.0 \times 10^8$ | $1.0 \times 10^8$ | $1.0 \times 10^5$ |
| | Settling amount (μm) | 4.0 | 2.5 | 3.0 | 4.0 | 4.0 | 3.0 | 3.5 | 4.0 |
| | Setting properties | Passed | Passed | Passed | Passed | Passed | Passed | Passed | Passed |
| | Antifogging properties | Good | Good | Good | Good | Good | Good | Good | Good |
| | Image density | Excellent | Excellent | Excellent | Excellent | Excellent | Excellent | Excellent | Excellent |

TABLE 3

| | | Comparative Example A | | | | | |
|---|---|---|---|---|---|---|---|
| | | 1 | 2 | 3 | 4 | 5 | 6 |
| | NBR | 100 | 100 | 100 | — | — | 50 |
| | ECO | — | — | — | — | — | — |
| | CR | — | — | — | — | — | — |
| | IR | — | — | — | 100 | 100 | 50 |
| | NR | — | — | — | — | — | — |
| | Hydrogenated IR | — | — | — | — | — | — |
| | Dispersing agent (1) | — | — | — | — | — | — |
| | Dispersing agent (2) | — | — | — | — | — | — |
| | Dispersing agent (3) | — | — | — | — | — | — |

TABLE 3-continued

|  |  | Comparative Example A | | | | | |
|---|---|---|---|---|---|---|---|
|  |  | 1 | 2 | 3 | 4 | 5 | 6 |
|  | Dispersing agent (4) | — | — | — | — | — | — |
|  | Dispersing agent (5) | — | — | — | — | — | — |
|  | Ion conductive agent | 1 | 1 | 1 | 1 | 1 | 1 |
|  | Carbon black | — | — | — | — | 10 | — |
|  | Peroxide vulcanizing agent | 3 | 2 | 4 | 3 | 3 | 3 |
|  | Sulfur | — | — | — | — | — | — |
|  | Vulcanizing accelerator (1) | — | — | — | — | — | — |
|  | Vulcanizing accelerator (2) | — | — | — | — | — | — |
| Physical | Elastic recovery rate (%) | 80 | 75 | 85 | 95 | 80 | 75 |
| properties | MD-1 hardness | 48 | 42 | 53 | 30 | 50 | 35 |
|  | Resistance value (Ω) | $5.0 \times 10^7$ | $5.0 \times 10^7$ | $5.0 \times 10^7$ | $1.0 \times 10^{12}$ | $1.0 \times 10^5$ | $1.0 \times 10^8$ |
| Evaluation | Settling amount (μm) | 8.0 | 12.0 | 4.0 | 2.0 | 8.0 | 12.0 |
|  | Setting properties | Failed | Failed | Passed | Excellent | Failed | Failed |
|  | Antifogging properties | Poor | Good | Poor | Good | Poor | Good |
|  | Image density | Good | Good | Good | Poor | Good | Good |

Comparative Examples A1 to A3 contain neither non-polar rubber nor a dispersing agent being blended with polar rubber. In other words, the rubber is made only from polar rubber. For this reason, neither low hardness nor low settling properties can be satisfied at higher levels than those of a conventional conductive rubber elastic body layer even if the amounts of the vulcanizing agents are adjusted. Thus, Comparative Examples A1 to A3 cannot compatibly attain both setting properties and antifogging properties. Comparative Examples A4 to A5 contain neither polar rubber nor a dispersing agent being blended with non-polar rubber. In other words, the rubber is made only from non-polar rubber. For this reason, neither low hardness nor low settling properties can be satisfied at higher levels than those of a conventional conductive rubber elastic body layer even if the amounts of the conductive agents are adjusted to achieve a low resistance. Thus, Comparative Examples A4 to A5 cannot compatibly attain both setting properties and antifogging properties. Comparative Example A6 contains non-polar rubber, but contains no dispersing agent being blended with polar rubber. For this reason, dispersibility of the polar rubber and the non-polar rubber is poor, and neither low hardness nor low settling properties can be satisfied at higher levels than those of a conventional conductive rubber elastic body layer. Thus, Comparative Example A6 cannot compatibly attain both setting properties and antifogging properties.

In contrast, Examples A contain non-polar rubber and dispersant agents being blended with polar rubber, so that the dispersibility of the polar rubber and the non-polar rubber is good, and low hardnesses and low settling properties can be satisfied at higher levels than those of a conventional conductive rubber elastic body layer, and low resistances are achieved. Thus, Examples A are excellent in all of setting properties, antifogging properties, and image density.

Among the dispersing agents, the epoxy-modified NR (Example A3) can contribute to a particularly low hardness and low settling properties, and thus the conductive rubber elastic body layer according to Example A3 is more excellent in setting properties and antifogging properties than the conductive rubber elastic body layers using other dispersing agents (Examples A1, A2, A4, and A5). Among the non-polar rubber, the IR (Example A3) can contribute to a lower hardness and lower settling properties than NR (Example A6), and thus the conductive rubber elastic body layer according to Example A3 is more excellent in setting properties. Among the polar rubber, the NER (Example A3) can contribute to a lower hardness and lower settling properties than ECO (Example A7) and CR (Example A8), and thus the conductive rubber elastic body layer according to Example A3 is more excellent in setting properties. According to Examples A3, and A10 to A12, as the amounts of the dispersing agents increase, the hardness tends to increase. According to Example A13, the hardness and the settling properties tend to get worse when an electroconductive agent (carbon black) for improving conductive properties is contained. According to Examples A14 to A15, the hardness and the settling properties tend to get worse when a larger amount of polar rubber is contained while the resistance tends to increase when a smaller amount of polar rubber is contained. According to Examples A16 to A17, peroxide cross-linking can contribute to lower settling properties than sulfur cross-linking.

Examples B1 to B10

Detailed descriptions of the used materials are provided below.

Nitrile rubber (NBR): "N237H" manufactured by JSR CORPORATION

Isoprene rubber (IR): "JSR IR2200" manufactured by JSR CORPORATION

Dispersing agent: a block copolymer of NBR and IR

Ion conductive agent: tetrabutylammonium bromide, "TBAB-100" manufactured by LION AKZO CO., LTD.

Carbon black (1) (electroconductive agent): "PRINTEX XE2B" manufactured by DEGUSSA AG, having a BET specific surface area of 950 (m$^2$/g)

Carbon black (2) (electroconductive agent): "BLACK-PEARLS 2000" manufactured by CABOT CORPORATION, having a BET specific surface area of 1475 (m$^2$/g)

Carbon black (3) (electroconductive agent): "SPECIAL BLACK 4" manufactured by DEGUSSA AG, having a BET specific surface area of 180 (m$^2$/g)

Peroxide vulcanizing agent: "PERCUMYL D40" manufactured by NOF CORPORATION.

<Preparation of Conductive Rubber Compositions>

Conductive rubber compositions were prepared by blending the components in accordance with the composition (mass ratios) indicated in Table 4, and stirring to mix each of the resultant mixtures with the use of a stirring machine.

<Preparation of Conductive Rolls>

Core bars (6 mm in diameter) were set on the central axes of molding dies having a cylindrical molding cavity of 9 mm in diameter, and the conductive rubber compositions were each injected into the molding dies. The conductive rubber compositions were heated/cross-linked at 160° C. for 30 minutes, and cooled to be released from the dies to form conductive rubber elastic body layers that have a thickness of 1.5 mm on the outer peripheries of the core bars. Conductive rolls were prepared in this manner.

Figure 9:
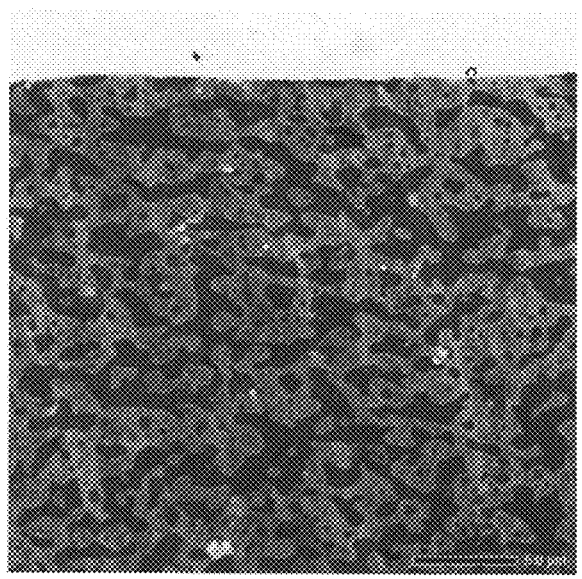
FIG. 9 is an enlarged cross-sectional photo of a conductive rubber elastic body layer according to Example B2.

The area ratios between conductive phases and non-conductive phases, the elastic recovery rates, the MD-1 hardnesses, and the resistance values of the obtained conductive rubber elastic body layers of the conductive rolls were measured. In addition, the product properties including setting properties, initial fogging properties, antifogging properties, and image densities of the obtained conductive rubber elastic body layers of the conductive rolls were evaluated. The setting properties are affected by the settling properties of the conductive rubber elastic body layers. The initial fogging properties are affected by the charging properties (the area ratios between two phases of the conductive rubber elastic body layers). The antifogging properties are affected by the hardnesses of the conductive rubber elastic body layers. The image densities are affected by the resistance values (conductive properties) of the conductive rubber elastic body layers. In addition, a cross-sectional photo of the conductive rubber elastic body layer of the conductive roll according to Example B2 is illustrated in FIG. 9 as a representative example. In FIG. 9, the relatively dark-colored portion indicates a non-conductive phase while the relatively faint-colored portion indicates a conductive phase. A scale (5 μm) for indicating the sizes of both the phases is provided in the lower right portion of FIG. 9.

(Area Ratio)

As illustrated in FIG. 3, a given cross section of each of the conductive rubber elastic body layers was observed, an arbitrarily selected region of 40×40 μm in the cross section was divided into 64, the shaded 16 squares that were arranged in oblique directions were selected, and the area ratios of the conductive phase and the non-conductive phase in each five×five μm square were calculated, and based on the values that 14 squares or more among the selected 16 squares (8.5 or more out of 10) have, the area ratio was determined.

(Elastic Recovery Rate)

The surfaces of the conductive rubber elastic body layers were measured under the following measurement conditions to determine the ηIT [0%] with the use of a micro hardness meter (FISCHERSCOPE H100C manufactured by FISCHER INSTRUMENTS K.K.) in accordance with the ISO 14577-1. To be specific, when the indenter is pushed into the surface of a material with the use of the micro hardness meter while the test load is kept constant, only a small portion of the total mechanical workload, Wtotal, of the dent, which is indicated during the push-in work, is consumed as a plastic deformation workload, Wplast, of the dent. The remaining portion is released as an elastic restoration deformation workload, Welast, of the dent when the test load is removed. Defining this mechanical workload as W=∫Fdh, the relation is indicated as follows. The conductive rubber elastic body layers having an elastic recovery rate of 80% or more were regarded as having low settling properties while the conductive rubber elastic body layers having an elastic recovery rate less than 80% were regarded as having high settling properties.

$$\eta IT[\%] = W\text{elast}/W\text{total},$$

where Wtotal=Welast+Wplast.

<Measurement Conditions>

Indenter: a pyramid shape diamond indenter having a facing angle of 136 degrees
Initial load: 0 mN
Push-in maximum load: 20 mN (constant load)
Time reaching the maximum load: 0.25 to 10 sec
Time holding the maximum load: 5 sec
Unloading time: 0.25 to 10 sec
Measurement temperature: 25° C.

(MD-1 Hardness (Micro Rubber Hardness))

Measurement was performed with the use of a cantilever leaf-spring loaded spring type hardness tester ("MICRO RUBBER DUROMETER/MD-1 TYPE" manufactured by KOBUNSHI KEIKI CO., LTD.) by bringing the tip of the push needle of the hardness tester into contact with the surface of the axially central portion of the conductive rubber elastic body layer of each of the held conductive rolls, further applying pressure vertically to each of the surfaces with a load of 33.85 g with the use of the tester, and immediately reading the scale. The conductive rubber elastic body layers having an MD-1 hardness of 50% or less were regarded as having a low hardness while the conductive rubber elastic body layers having an MD-1 hardness higher than 50% were regarded as having a high hardness.

(Resistance Value)

While both ends of each conductive roll were pressed against a metal roll (diameter: 30 mm) at a predetermined load, the metal roll was rotated at a predetermined rotational speed, whereby each of the conductive rolls was corotated. While maintaining this state (while the metal roll and each of the conductive rolls were corotated), a voltage of 10 V was placed between the ends of each of the conductive rolls and the metal roll, and the carried current values were measured to determine electrical resistance values (roll resistance: Ω). The conductive rubber elastic body layers having a volume resistivity of $1 \times 10^9 \Omega$ were regarded as having a high resistance while the conductive rubber elastic body layers having a volume resistivity within the range of $1 \times 10^2 \Omega$ to $1 \times 10^9 \Omega$ were regarded as having a low resistance.

(Setting Properties)

Each of the conductive rolls was mounted on a cartridge, and sealed to be left in a normal temperature and normal humidity environment for 14 days. Then, imaging was performed in a normal temperature and normal humidity environment. Images having a streak-like flaw were rated "failed" while images having no streak-like flaw were rated "passed". In addition, the roundness of each of the conductive rubber elastic body layers was measured with the use of a RONDCOM, and based on the amounts of the dents with respect to the roundness, the settling amounts were measured. The conductive rubber elastic body layers having a settling amount of 5 μm or less were regarded as having low settling properties while the conductive rubber elastic body layers having a settling amount more than 5 μm were regarded as having high settling properties. Among the conductive rubber elastic body layers having setting properties rated "passed", the conductive rubber elastic body layers having a settling amount of 2 μm or less were rated "excellent".

(Initial Fogging Properties)

Each of the conductive rolls was mounted on a cartridge, and white solid images were printed. Image densities were measured with the use of a white photometer. Images having its given nine points within the range of 1.40 to 1.46 were rated as having "good" initial fogging properties while images having its given nine points out of the range were rated as having "poor" initial fogging properties. Among the images rated as having "good" initial fogging properties, the images having its given nine points within the range of 1.43 to 1.45 were rated as having "excellent" initial fogging properties.

(Anti Fogging Properties)

Each of the conductive rolls was mounted on a cartridge, and left in a low temperature and low humidity environment (at 15° C. at a humidity of 10%) for 12 hours or longer. Then, an endurance test using an actual apparatus was performed in this environment by performing 5% printing of 10000 sheets of paper. Then, image densities were measured with the use of a white photometer. Images having its given nine points within the range of 1.40 to 1.46 were rated as having "good" antifogging properties while images having its given nine points out of the range were rated as having "poor" antifogging properties. Among the images rated as having "good" antifogging properties, the images having its given nine points within the range of 1.43 to 1.45 were rated as having "excellent" antifogging properties.

(Image Density)

Each of the conductive rolls was mounted on a cartridge, and black solid images were printed. Image densities were measured with the use of a white photometer. Images having a white luminosity at its given nine points within the range of 1.0 to 2.0 were rated as having a "good" image density while images having a white luminosity at its given nine points out of the range were rated as having a "poor" image density. Among the images rated as having a "good" image density, the images having a white luminosity at its given nine points within the range of 1.3 to 1.6 were rated as having an "excellent" image density.

In each of Examples B, the conductive phase has an area ratio within the predetermined range in an arbitrarily selected region of a five-μm square in the conductive rubber elastic body layer, and thus the conductive phase and the non-conductive phase are uniformly dispersed at a toner size level (finely dispersed) as illustrated in FIG. 9, so that the conductive agents in the conductive rubber elastic body layers of Examples B have excellent dispersibility, and thus the conductive rubber elastic body layers of Examples B have excellent charging properties. Thus, satisfying initial fogging properties can be achieved. In addition, a satisfying low hardness, satisfying low settling properties, a satisfying low resistance, satisfying setting properties, a satisfying image density, and satisfying antifogging properties can be achieved.

As evident from Examples B2, B9, and B10, as the BET specific surface area of the electroconductive agent to be blended increases, the amount of the electroconductive agent required to obtain the same resistance value as those of the other electroconductive agents can be reduced, and accordingly the electroconductive agent having a larger BET specific surface area can contribute to a lower hardness, and lower settling. Alternatively, the electroconductive agent having a larger BET specific surface area can contribute to a lower resistance even if used in the same amount as the other electroconductive agents. In addition, as evident from Examples B2 to B6, the conductive rubber elastic body layers, in which the conductive phases have an area ratio within the range of 20 to 80% in an arbitrarily selected region of a five-μm square, are particularly excellent in initial fogging properties.

TABLE 4

| | | Example B | | | | | | | | | |
|---|---|---|---|---|---|---|---|---|---|---|---|
| | | 1 | 2 | 3 | 4 | 5 | 6 | 7 | 8 | 9 | 10 |
| Formulation | NBR | 50 | 50 | 90 | 10 | 80 | 20 | 50 | 50 | 50 | 50 |
| | IR | 50 | 50 | 10 | 90 | 20 | 80 | 50 | 50 | 50 | 50 |
| | Dispersing agent | 5 | 5 | 5 | 5 | 5 | 5 | 5 | 5 | 5 | 5 |
| | Ion conductive agent | 1 | — | — | — | — | — | — | — | — | — |
| | CB(1) 950 ($m^2/g$) | — | 10 | 10 | 10 | 10 | 10 | 9 | 15 | — | — |
| | CB(2) 1475 ($m^2/g$) | — | — | — | — | — | — | — | — | 8 | — |
| | CB(3) 180 ($m^2/g$) | — | — | — | — | — | — | — | — | — | 20 |
| | Peroxide vulcanizing agent | 3 | 3 | 3 | 3 | 3 | 3 | 3 | 3 | 3 | 3 |
| Area ratio | Conductive phase (%) | 50 | 50 | 90 | 10 | 80 | 20 | 50 | 50 | 50 | 50 |
| | Non-conductive phase (%) | 50 | 50 | 10 | 90 | 20 | 80 | 50 | 50 | 50 | 50 |
| Physical properties | Elastic recover rate (%) | 90 | 85 | 85 | 90 | 85 | 90 | 87 | 80 | 87 | 80 |
| | MD-1 hardness | 40 | 45 | 48 | 38 | 47 | 40 | 40 | 50 | 43 | 50 |
| | Resistance value (Ω) | $3.0 \times 10^8$ | $1.0 \times 10^5$ | $7.0 \times 10^4$ | $4.0 \times 10^5$ | $8.0 \times 10^4$ | $3.0 \times 10^5$ | $1.0 \times 10^8$ | $3.0 \times 10^2$ | $1.0 \times 10^5$ | $1.0 \times 10^5$ |
| Evaluation | Setting propeties | Excellent | Passed | Passed | Excellent | Passed | Excellent | Passed | Passed | Passed | Passed |
| | Initial fogging properties | Excellent | Excellent | Good | Good | Excellent | Excellent | Excellent | Excellent | Excellent | Excellent |
| | Antifogging properties | Excellent | Good | Good | Good | Good | Excellent | Excellent | Good | Good | Good |
| | Image density | Good | Excellent | Excellent | Excellent | Excellent | Excellent | Good | Excellent | Excellent | Excellent |

Examples C1 to C5, Comparative Example C1

Detailed descriptions of the used materials are provided below.

Nitrile rubber (NBR): "N237H" manufactured by JSR CORPORATION

Isoprene rubber (IR): "JSR IR2200" manufactured by JSR CORPORATION

Natural rubber (NR): natural rubber with grade RSS1 of international standard

Epoxidized natural rubber (epoxidized NR): "EPDXY-PRENE 50" manufactured by MUANG MAI GUTHRIE PUBLIC COMPANY LIMITED (a 50% modified product)

Note that epoxy-modified natural rubber (epoxidized NR) having other modification rates was adjusted with reference to WO2013/133380A1.

Block copolymer of NBR and IR (NBIR): "NIPOL DN1201" manufactured by ZEON CORPORATION Ion conductive agent: tetrabutylammonium bromide, "TBAB-100" manufactured by LION AKZO CO., LTD.

Carbon black (electroconductive agent): "PRINTEX XE2B" manufactured by DEGUSSA AG, having a BET specific surface area of 950 (m$^2$/g)

Peroxide vulcanizing agent: "PERCUMYL D40" manufactured by NOF CORPORATION.

<Preparation of Conductive Rubber Compositions>

Conductive rubber compositions were prepared by blending the components in accordance with the composition (mass ratios) indicated in Table 5, and stirring to mix each of the resultant mixtures with the use of a stirring machine.

<Preparation of Conductive Rolls>

Core bars (6 mm in diameter) were set on the central axes of molding dies having a cylindrical molding cavity of 9 mm in diameter, and the conductive rubber compositions were each injected into the molding dies. The conductive rubber compositions were heated/cross-linked at 160° C. for 30 minutes, and cooled to be released from the dies to form conductive rubber elastic body layers that have a thickness of 1.5 nail on the outer peripheries of the core bars. Conductive rolls were prepared in this manner.

Observation of the phase structures, and measurement of the elastic recovery rates, the MD-1 hardnesses, and the resistance values of the obtained conductive rubber elastic body layers of the conductive rolls were performed. In addition, the product properties including setting properties, initial fogging properties, antifogging properties, image densities, and toner adhesion properties of the obtained conductive rubber elastic body layers of the conductive rolls were evaluated. These results are indicated in Table 5. The setting properties are affected by the settling properties of the conductive rubber elastic body layers. The initial fogging properties are affected by the charging properties (the area ratios between two phases of the conductive rubber elastic body layers). The antifogging properties are affected by the hardnesses of the conductive rubber elastic body layers. The image densities are affected by the resistance values (conductive properties) of the conductive rubber elastic body layers.

Figure 10A:
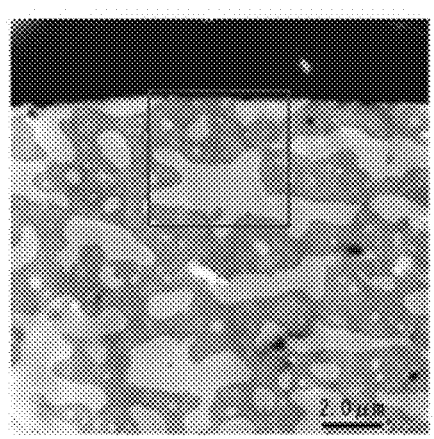
FIGS. 10A-10C are enlarged cross-sectional photos of a conductive rubber elastic body layer according to Example C2.
Figure 10B:
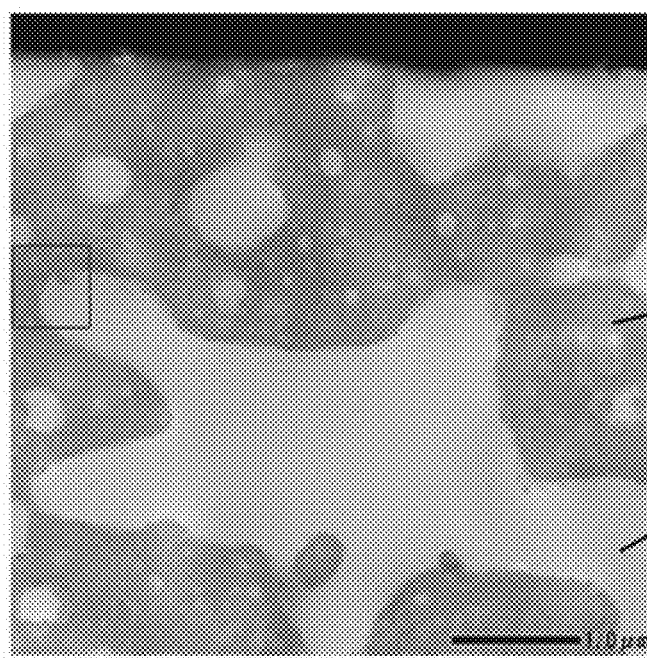
Figure 10C:
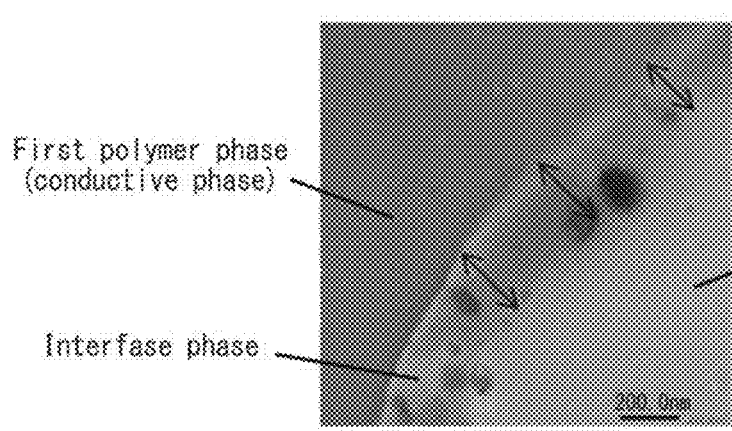
Figure 11:
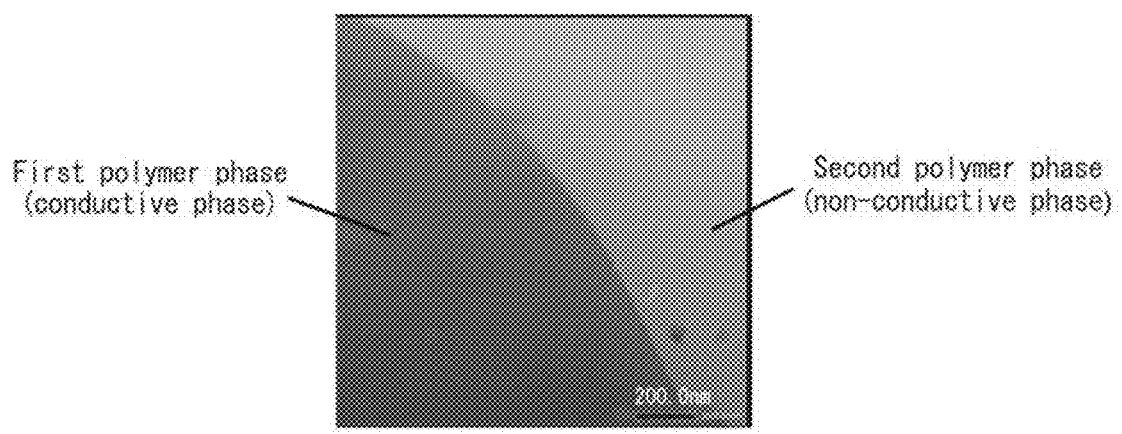
FIG. 11 is an enlarged cross-sectional photo of a conductive rubber elastic body layer according to Example C1.

In addition, a cross-sectional photo of the conductive rubber elastic body layer of the conductive roll according to Example C2 is illustrated in FIG. 10 as a representative example, and a cross-sectional photo of the conductive rubber elastic body layer of the conductive roll according to Comparative Example C1 is illustrated in FIG. 11. FIG. 10B is an enlarged photo of the portion surrounded by the square in FIG. 10A. FIG. 10C is an enlarged photo of the portion surrounded by the square in FIG. 10B. In FIGS. 10 and 11, the relatively dark-colored portions indicate conductive first polymer phases while the relatively faint-colored portions indicate non-conductive second polymer phases, and the phases that are present around the second polymer phases define interface phases as illustrated in FIG. 10C. A scale for indicating the sizes of the phases is provided in the lower right portion of each figure.

(Interface Phase Thickness)

A given cross section of each of the conductive rubber elastic body layers was observed, and the thickness of an interphase phase observed in an arbitrarily selected region of 40×40 µm in the cross section was measured.

(Area Ratio)

As illustrated in FIG. 3, a given cross section of each of the conductive rubber elastic body layers was observed, an arbitrarily selected region of 40×40 µm in the cross section was divided into 64, the shaded 16 squares that are arranged in oblique directions were selected, and the area ratios of the first polymer phase (conductive phase) and the second polymer phase (non-conductive phase) in each five×five µm square were calculated, and based on the values that 14 squares or more among the selected 16 squares (8.5 or more out of 10) have, the area ratio was determined. The conductive rubber elastic body layers having an area ratio within the range of 10 to 90% relative to a total of the first polymer phase and the second polymer phase were rated "good" while the conductive rubber elastic body layers having an area ratio out of the range were rated "poor".

(Elastic Recovery Rate)

The surfaces of the conductive rubber elastic body layers were measured under the following measurement conditions to determine the ηIT [%] with the use of a micro hardness meter (FISCHERSCOPE H100C manufactured by FISCHER INSTRUMENTS K.K.) in accordance with the ISO 14577-1. To be specific, when the indenter is pushed into the surface of a material with the use of the micro hardness meter while the test load is kept constant, only a small portion of the total mechanical workload, Wtotal, of the dent, which is indicated during the push-in work, is consumed as a plastic deformation workload, Wplast, of the dent. The remaining portion is released as an elastic restoration deformation workload, Welast, of the dent when the test load is removed. Defining this mechanical workload as W=∫Fdh, the relation is indicated as follows. The conductive rubber elastic body layers having an elastic recovery rate of 80% or more were regarded as having low settling properties while the conductive rubber elastic body layer having an elastic recovery rate less than 80% was regarded as having high settling properties.

$\eta IT[\%]=W\text{elast}/W\text{total}$, where Wtotal=Welast+Wplast.

<Measurement Conditions>

Indenter: a pyramid shape diamond indenter having a facing angle of 136 degrees

Initial load: 0 mN

Push-in maximum load: 20 mN (constant load)

Time reaching the maximum load: 0.25 to 10 sec

Time holding the maximum load: 5 sec

Unloading time: 0.25 to 10 sec

Measurement temperature: 25° C.

(MD-1 Hardness (Micro Rubber Hardness))

Measurement was performed with the use of a cantilever leaf-spring loaded spring type hardness tester ("MICRO RUBBER DUROMETER/MD-1 TYPE" manufactured by KOBUNSHI KEIKI CO., LTD.) by bringing the tip of the push needle of the hardness tester into contact with the surface of the axially central portion of the conductive rubber elastic body layer of each of the held conductive rolls, further applying pressure vertically to each of the surfaces with a load of 33.85 g with the use of the tester, and immediately reading the scale. The conductive rubber elastic body layers having an MD-1 hardness of 50% or less were regarded as having a low hardness while the conductive rubber elastic body layers having an MD-1 hardness higher than 50% were regarded as having a high hardness.

(Resistance Value)

While both ends of each conductive roll were pressed against a metal roll (diameter: 30 mm) at a predetermined load, the metal roll was rotated at a predetermined rotational speed, whereby each of the conductive rolls was corotated. While maintaining this state (while the metal roll and each of the conductive rolls were corotated), a voltage of 10 V was placed between the ends of each of the conductive rolls and the metal roll, and the carried current values were measured to determine electrical resistance values (roll resistance: Ω). The conductive rubber elastic body layers having a volume resistivity of $1\times10^9\Omega$ were regarded as having a high resistance while the conductive rubber elastic body layers having a volume resistivity within the range of $1\times10^2\Omega$ to $1\times10^9\Omega$ were regarded as having a low resistance.

(Setting Properties)

Each of the conductive rolls was mounted on a cartridge, and sealed to be left in a normal temperature and normal humidity environment for 14 days. Then, imaging was performed in a normal temperature and normal humidity environment. Images having a streak-like flaw were rated "failed" while images having no streak-like flaw were rated "passed". In addition, the roundness of each of the conductive rubber elastic body layers was measured with the use of a RONDCOM, and based on the amounts of the dents with respect to the roundness, the settling amounts were measured. The conductive rubber elastic body layers having a settling amount of 5 μm or less were regarded as having low settling properties while the conductive rubber elastic body layers having a settling amount more than 5 μm were regarded as having high settling properties. Among the conductive rubber elastic body layers having setting properties rated "passed", the conductive rubber elastic body layers having a settling amount of 2 μm or less were rated "excellent".

(Initial Fogging Properties)

Each of the conductive rolls was mounted on a cartridge, and white solid images were printed. Image densities were measured with the use of a white photometer. Images having its given nine points within the range of 1.40 to 1.46 were rated as having "good" initial fogging properties while images having its given nine points out of the range were rated as having "poor" initial fogging properties. Among the images rated as having "good" initial fogging properties, the images having its given nine points within the range of 1.43 to 1.45 were rated as having "excellent" initial fogging properties.

(Anti Fogging Properties)

Each of the conductive rolls was mounted on a cartridge, and left in a low temperature and low humidity environment (at 15° C. at a humidity of 10%) for 12 hours or longer. Then, an endurance test using an actual apparatus was performed in this environment by performing 5% printing of 10000 sheets of paper. Then, image densities were measured with the use of a white photometer. Images having its given nine points within the range of 1.40 to 1.46 were rated as having "good" antifogging properties while images having its given nine points out of the range were rated as having "poor" anti fogging properties. Among the images rated as having "good" antifogging properties, the images having its given nine points within the range of 1.43 to 1.45 were rated as having "excellent" antifogging properties.

(Image Density)

Each of the conductive rolls was mounted on a cartridge, and black solid images were printed. Image densities were measured with the use of a white photometer. Images having a white luminosity at its given nine points within the range of 1.0 to 2.0 were rated as having a "good" image density while images having a white luminosity at its given nine points out of the range were rated as having a "poor" image density. Among the images rated as having a "good" image density, the images having a white luminosity at its given nine points within the range of 1.3 to 1.6 were rated as having an "excellent" image density.

[Toner Adhesion Properties]

Each of the conductive rolls was mounted on a cartridge, and only one solid image was printed. Then, the conductive rolls were left in a normal temperature and normal humidity environment for 14 days. Then, the conductive rolls were taken out of the cartridges, and the surfaces of the conductive rolls were subjected to air blow. The conductive rolls that had streak-like toner adhesion on their surfaces were rated "failed" while the conductive rolls that had no streak-like toner adhesion on their surfaces were rated "passed".

TABLE 5

|  |  | Example C ||||| Comparative Example C |
| --- | --- | --- | --- | --- | --- | --- | --- |
|  |  | 1 | 2 | 3 | 4 | 5 | 1 |
| Formulation | NBR | 45 | 45 | 40 | 45 | 45 | 50 |
|  | IR | 50 | 50 | 50 | 50 | 50 | 45 |
|  | NR | — | — | — | — | — | 5 |
|  | Epoxidized NR(10% modified) | 5 | — | — | — | — | — |
|  | Epoxidized NR(50% modified) | — | 5 | 10 | — | — | — |
|  | Epoxidized NR(90% modified) | — | — | — | 5 | — | — |
|  | Epoxidized NR(95% modified) | — | — | — | — | — | — |
|  | NBIR | — | — | — | — | 5 | — |
|  | Ion conductive agent | 1 | 1 | 1 | 1 | 1 | 1 |
|  | CB 950 (m²/g) | 10 | 10 | 10 | 10 | 10 | 10 |
|  | Peroxide vulcanizing agent | 3 | 3 | 3 | 3 | 3 | 3 |
|  | Interface phase thickness (nm) | 100 | 200 | 1000 | 50 | 100 | 0 |
|  | Area ratio of first polymer phase | Good | Good | Good | Good | Good | Poor |

TABLE 5-continued

|  |  | Example C | | | | | Comparative Example C |
|---|---|---|---|---|---|---|---|
|  |  | 1 | 2 | 3 | 4 | 5 | 1 |
| Physical properties | Elastic recovery rate (%) | 90 | 89 | 80 | 90 | 90 | 79 |
|  | MD-1 hardness | 45 | 45 | 43 | 45 | 45 | 40 |
|  | Resistance value (Ω) | $1.0 \times 10^5$ | $2.0 \times 10^5$ | $5.0 \times 10^5$ | $2.0 \times 10^5$ | $1.0 \times 10^5$ | $8.0 \times 10^4$ |
| Evaluation | Setting Propeties | Passed | Passed | Passed | Passed | Passed | Failed |
|  | Initial fogging properties | Good | Good | Good | Good | Good | Poor |
|  | Antifogging properties | Good | Good | Good | Good | Good | — |
|  | Image density | Good | Good | Good | Good | Good | Good |
|  | toner adhesion properties | Passed | Passed | Passed | Passed | Passed | Failed |

In Comparative Example C1, while the first polymer phase (conductive phase) and the second polymer phase (non-conductive phase) are present in the conductive rubber elastic body layer, there is no interface phase in the conductive rubber elastic body layer, as illustrated in FIG. 11. For this reason, toner adhesion (contamination) cannot be surpressed in Comparative Example C1. In addition, the area ratio of the first polymer phase (conductive phase) in an arbitrarily selected region of five-μm square in the conductive rubber elastic body layer is larger, so that the first polymer phase (conductive phase) is not dispersed at a toner size level. For this reason, the dispersibility of the electroconductive agent in the conductive rubber elastic body layer is poor because the dispersibility is significantly affected by agglomeration (dispersibility) of the electroconductive agent in the first polymer phase (conductive phase). Thus, resistance irregularity occurs to deteriorate the charging properties, and satisfying initial fogging properties cannot be achieved. In addition, a satisfying elastic recovery rate or setting properties cannot be achieved.

In contrast, in each of Examples C, while the first polymer phase (conductive phase) and the second polymer phase (non-conductive phase) are present in the conductive rubber elastic body layer, there is an interface phase between the first polymer phase (conductive phase) and the second polymer phase (non-conductive phase) in the conductive rubber elastic body layer, as illustrated in FIG. 10. For this reason, toner adhesion (contamination) is suppressed in Examples C. In addition, since the area ratio of the first polymer phase (conductive phase) in an arbitrarily selected region of five-μm square in the conductive rubber elastic body layer is in the desired range, both of the first polymer phase (conductive phase) and the second polymer phase (non-conductive phase) are uniformly dispersed (finely dispersed) at a toner size level (finely dispersed) as illustrated in FIG. 10A, so that the conductive agents in the conductive rubber elastic body layers of Examples C have excellent dispersibility, and thus the conductive rubber elastic body layers of Examples C have excellent charging properties. Thus, satisfying initial fogging properties can be achieved. In addition, a satisfying low hardness, satisfying low settling properties, a satisfying low resistance, satisfying setting properties, a satisfying image density, and satisfying antifogging properties can be achieved.

As evident from Examples C, when the interface phases have a thickness within the range of 10 to 300 nm, a lower hardness and lower settling properties can be achieved.

Having thus described in detail embodiments of the present invention, the present invention is not intended to be limited to the above embodiments, various modifications are possible without departing from the scope of the present invention.

The invention claimed is:

1. A conductive member for an electrophotographic apparatus, the member comprising a conductive rubber elastic body layer comprising: polar rubber; non-polar rubber; and a dispersing agent,
    wherein the polar rubber comprises at least one of nitrile rubber, hydrin rubber, and chloroprene rubber,
    wherein the non-polar rubber comprises at least one of isoprene rubber, hydrogenated isoprene rubber, and natural rubber,
    wherein the dispersing agent comprises at least one of a polymer comprising a block comprising a nitrile rubber component and a block comprising an isoprene rubber component, modified natural rubber, and modified isoprene rubber, and
    wherein the content of the dispersing agent is within a range of 0.1 to 20 parts by mass relative to total 100 parts by mass of the polar rubber and the non-polar rubber.

2. The conductive member for an electrophotographic apparatus according to claim 1,
    wherein the dispersing agent comprises at least one of epoxidized natural rubber and epoxidized isoprene rubber.

3. The conductive member for an electrophotographic apparatus according to claim 2, wherein the content ratio between the polar rubber and the non-polar rubber is, in parts by mass, within a range of 20:80 to 90:10.

4. The conductive member for an electrophotographic apparatus according to claim 3, wherein the conductive rubber elastic body layer comprises a first polymer phase comprising the polar rubber and a second polymer phase comprising the non-polar rubber, the second polymer phase being present separated from the first polymer phase.

5. The conductive member for an electrophotographic apparatus according to claim 4, wherein in the conductive rubber elastic body layer, the first polymer phase is a continuous phase, and the second polymer phase is one of a continuous phase and a dispersed phase.

6. The conductive member for an electrophotographic apparatus according to claim 5, wherein the first polymer phase comprises a larger amount of conductive agent than the second polymer phase.

7. The conductive member for an electrophotographic apparatus according to claim 6, wherein either one of the first polymer phase and the second polymer phase is a conductive phase, and the other is a non-conductive phase.

8. The conductive member for an electrophotographic apparatus according to claim 7, wherein the conductive phase has an area ratio within a range of 10 to 90% in an arbitrarily selected region of a five-μm square in the conductive rubber elastic body layer.

9. The conductive member for an electrophotographic apparatus according to claim 8, the conductive member having a resistance within a range of $1\times10^2$ to $1\times10^9 \Omega$ when a voltage of 10 V is applied.

10. The conductive member for an electrophotographic apparatus according to claim 9, wherein the conductive phase comprises an electroconductive agent, and the electroconductive agent has a specific surface area within a range of 150 to 1500 $m^2/g$.

11. The conductive member for an electrophotographic apparatus according to claim 10, wherein the conductive phase has an area ratio within a range of 20 to 80% in an arbitrarily selected region of a five-µm square in the conductive rubber elastic body layer.

12. The conductive member for an electrophotographic apparatus according to claim 11, wherein the conductive rubber elastic body layer further comprises an interface phase between the first polymer phase and the second polymer phase, the interface phase comprising the dispersing agent.

13. The conductive member for an electrophotographic apparatus according to claim 12, wherein the interface phase has a thickness within a range of 10 to 1000 nm.

14. The conductive member for an electrophotographic apparatus according to claim 13, wherein the thickness of the interface phase is within a range of 10 to 200 nm.

15. The conductive member for an electrophotographic apparatus according to claim 14, wherein the area ratio of the conductive phase is within a range of 40 to 60% in an arbitrarily selected region of a five-µm square in the conductive rubber elastic body layer.

16. The conductive member for an electrophotographic apparatus according to claim 1, wherein the content ratio between the polar rubber and the non-polar rubber is, in parts by mass, within a range of 20:80 to 90:10.

17. The conductive member for an electrophotographic apparatus according to claim 1, wherein the conductive rubber elastic body layer comprises a first polymer phase comprising the polar rubber and a second polymer phase comprising the non-polar rubber, the second polymer phase being present separated from the first polymer phase.

18. The conductive member for an electrophotographic apparatus according to claim 17, wherein in the conductive rubber elastic body layer, the first polymer phase is a continuous phase, and the second polymer phase is one of a continuous phase and a dispersed phase.

19. The conductive member for an electrophotographic apparatus according to claim 17, wherein the conductive member comprises a conductive agent, and the first polymer phase comprises a larger amount of the conductive agent than the second polymer phase.

20. The conductive member for an electrophotographic apparatus according to claim 17, wherein either one of the first polymer phase and the second polymer phase is a conductive phase, and the other is a non-conductive phase.

21. The conductive member for an electrophotographic apparatus according to claim 20, wherein the conductive phase has an area ratio within a range of 10 to 90% in an arbitrarily selected region of a five-µm square in the conductive rubber elastic body layer.

22. The conductive member for an electrophotographic apparatus according to claim 20, the conductive member having a resistance within a range of $1\times10^2$ to $1\times10^9 \Omega$ when a voltage of 10 V is applied.

23. The conductive member for an electrophotographic apparatus according to claim 20, wherein the conductive phase comprises an electroconductive agent, and the electroconductive agent has a specific surface area within a range of 150 to 1500 $m^2/g$.

24. The conductive member for an electrophotographic apparatus according to claim 20, wherein the conductive phase has an area ratio within a range of 20 to 80% in an arbitrarily selected region of a five-µm square in the conductive rubber elastic body layer.

25. The conductive member for an electrophotographic apparatus according to claim 24, wherein the area ratio of the conductive phase is within a range of 40 to 60% in an arbitrarily selected region of a five-µm square in the conductive rubber elastic body layer.

26. The conductive member for an electrophotographic apparatus according to claim 17, wherein the conductive rubber elastic body layer further comprises an interface phase between the first polymer phase and the second polymer phase, the interface phase comprising the dispersing agent.

27. The conductive member for an electrophotographic apparatus according to claim 26, wherein the interface phase has a thickness within a range of 10 to 1000 nm.

28. The conductive member for an electrophotographic apparatus according to claim 27, wherein the thickness of the interface phase is within a range of 10 to 200 nm.

* * * * *